US008788624B2

(12) United States Patent
Finlayson

(10) Patent No.: US 8,788,624 B2
(45) Date of Patent: Jul. 22, 2014

(54) SYSTEM AND METHOD FOR CONTROLLING DELIVERY OF MEDIA DATA TO TARGET DEVICES

(75) Inventor: Piers Daniel Finlayson, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 727 days.

(21) Appl. No.: 12/326,838

(22) Filed: Dec. 2, 2008

(65) Prior Publication Data

US 2009/0298521 A1 Dec. 3, 2009

(30) Foreign Application Priority Data

Jun. 3, 2008 (GB) .................................. 0810093.5

(51) Int. Cl.
*G06F 15/16* (2006.01)
*H04M 11/00* (2006.01)
(52) U.S. Cl.
USPC ..................... 709/219; 709/245; 379/88.13
(58) Field of Classification Search
USPC ................. 709/219, 245; 379/88.13
See application file for complete search history.

(56) References Cited

U.S. PATENT DOCUMENTS

| 6,263,202 | B1* | 7/2001 | Kato et al. ..................... 455/418 |
| 6,822,955 | B1* | 11/2004 | Brothers et al. ............. 370/389 |
| 6,937,574 | B1* | 8/2005 | Delaney et al. ............... 370/254 |
| 6,973,667 | B2* | 12/2005 | Fritsch ............................ 725/88 |
| 2002/0035624 | A1* | 3/2002 | Kim ............................... 709/222 |
| 2002/0150083 | A1 | 10/2002 | Fangman et al. |
| 2004/0261093 | A1* | 12/2004 | Rebaud et al. ................... 725/25 |
| 2005/0033985 | A1* | 2/2005 | Xu et al. ......................... 713/201 |
| 2007/0140299 | A1* | 6/2007 | Hofmann et al. ............. 370/486 |
| 2007/0286361 | A1* | 12/2007 | West et al. .................. 379/88.13 |

FOREIGN PATENT DOCUMENTS

| CN | 100341294 C | 4/2006 |
| CN | 101159721 A | 4/2008 |
| JP | 2004096343 A | 3/2004 |
| WO | WO2006/097269 | 9/2006 |
| WO | WO2007/056514 | 5/2007 |
| WO | WO2007/140162 | 12/2007 |

OTHER PUBLICATIONS

Search Report dated Jul. 21, 2008, issued in Great Britain Application No. GB0810093.5.
Search Report dated Oct. 3, 2008, issued in Great Britain Application No. GB0810093.5.

* cited by examiner

*Primary Examiner* — Jeong S Park
(74) *Attorney, Agent, or Firm* — EIP US LLP

(57) ABSTRACT

A system, method, and apparatus for controlling the delivery of media data to a plurality of target devices in a target network is disclosed. The system, method, and apparatus allows for control of the delivery of media data from a source device to a plurality of target devices in a target network to be carried out remotely to the target network, but without the need for media data to pass out from or back into the target network via the access network.

22 Claims, 11 Drawing Sheets

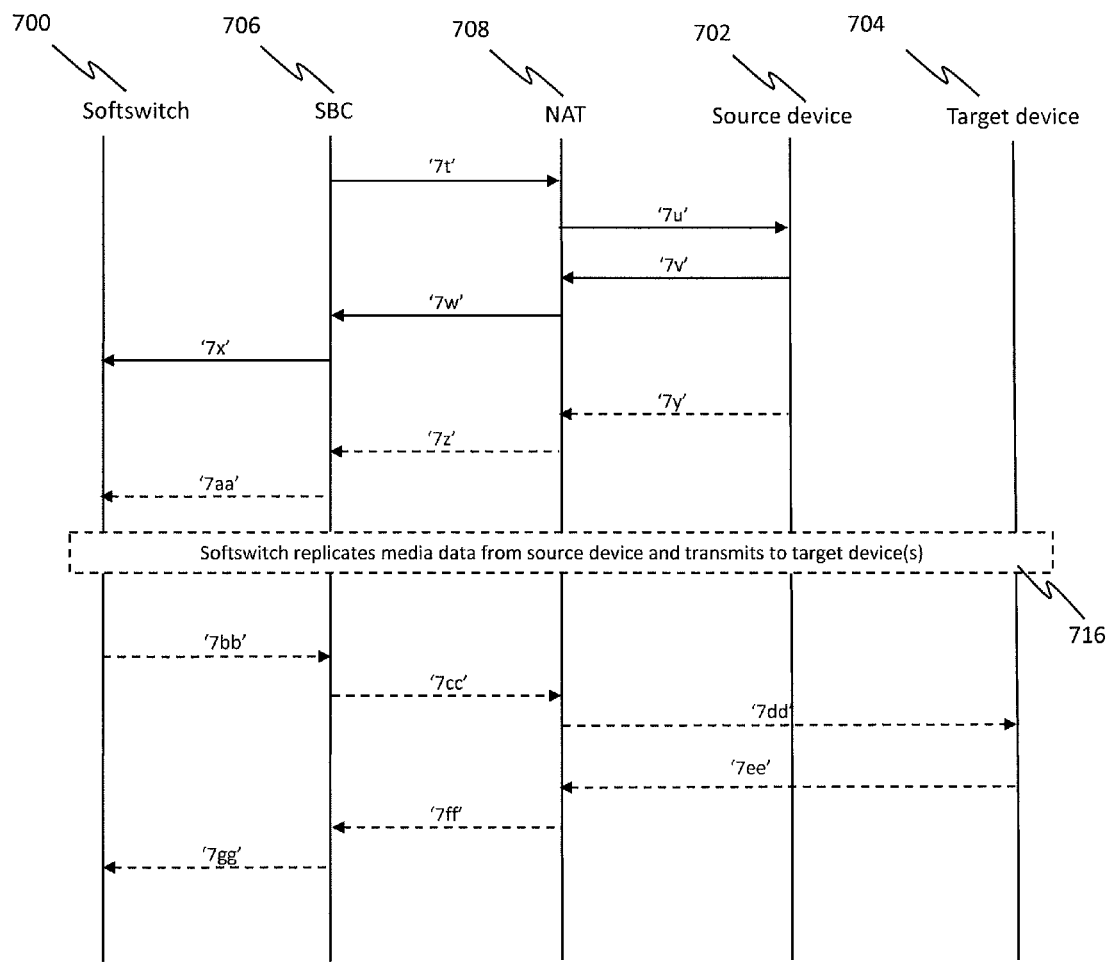
FIG. 7B                                PRIOR ART

SYSTEM AND METHOD FOR CONTROLLING DELIVERY OF MEDIA DATA TO TARGET DEVICES

CROSS-REFERENCE TO RELATED APPLICATIONS

This application claims priority under 35 U.S.C. §119(a) to Great Britain Application No. GB 0810093.5, filed on Jun. 3, 2008, the entire disclosure of which is incorporated by reference herein.

BACKGROUND OF THE INVENTION

1. Field of the Invention

The present invention relates to the delivery of media data in a group communications service. In particular, the present invention relates to methods and apparatus for controlling the delivery of media data to a plurality of target devices in a target network.

2. Description of the Related Technology

Various group communications systems allow media data to be delivered from one point in a network to more than one other point in a network. An example of such is a group paging service in which a user of a source device delivers media data to a plurality of target devices. An example application of such group paging services may involve delivery of an announcement from one user of the system to a number of other users of the system.

The term 'group paging' as used herein describes a communications system function whereby a paging party having a paging device can transmit an announcement to a set of target devices. A group paging service may be implemented using a variety of mechanisms. For example, a paging party may press a button on a paging device and speak into a microphone. Alternatively, where the paging device is a telephone, the paging party may pick up a telephone, dial an extension, and then speak into a microphone in the telephone handset. In any case, the system may be set up so that the paging party's voice is output through a number of target device loudspeakers around the paging system premises. Typically, the target devices include telephone devices and the audio output loudspeakers are built into the telephone devices.

Depending on the sophistication of the group paging system, multiple "zones" may be supported. A zone represents a predetermined set of target devices in a group communications service such as group paging. Zones may overlap (so a target device may be in more than one zone). When zones are used, the paging party may either specify the zone by the extension number dialed, or the paging device may subsequently prompt for a zone code to be entered after an initial extension number for group paging services is dialed.

In legacy telephone systems, group paging is typically provided by dedicated group paging apparatus connected to a Private Branch Exchange (PBX) in a customer premises telephone switching network, or an equivalent system. Dialing an extension number for group paging services then results in the paging party connecting to the legacy paging apparatus.

It is known to connect legacy group paging apparatus to a hosted packet-based Central Exchange ('Centrex') or PBX systems, however in this case there is no on-premises PBX to interface to the legacy paging apparatus. Several attempts have been made to tackle this problem, including both premises-based and host-based approaches.

A premises-based approach requires the use of a further apparatus, such as a gateway adaptor entity, which is deployed at the customer premises to interface to the legacy paging apparatus. The gateway adaptor entity connects to the paging apparatus and may communicate with it for example using a Plain Old Telephone Service (POTS) via a Foreign Exchange Office (FXO) and Foreign Exchange Station (FXS) interface pair, or using packet-based communications and a signaling protocol such as the Session Initiation Protocol (SIP). Just as in the PBX case, the paging party dials an extension number for paging services, and is connected to the paging apparatus, with the option to then enter a zone code to initiate paging. The premises-based approach has the advantages that it re-uses the existing legacy paging apparatus and uses relatively low bandwidth to and from the customer premises. However, the premises-based approach has the disadvantages that it requires an additional piece of apparatus (the gateway adaptor entity) located at the customer premises, and also suffers in that multiple pieces of apparatus must be managed and maintained at multiple locations, without any common look and feel.

A host-based approach can be implemented using a softswitch telephone system located in a remote access network such as the Internet. The softswitch telephone system hosts paging functionality remotely, and can work in conjunction with SIP telephone handsets and loudspeakers to provide paging services. For example, when a paging party dials an extension to access paging services, their paging device connects to the softswitch telephone system and the paging party is prompted to enter a zone code. To deliver paging media data, the softswitch telephone system sets up calls to each target device in the zone, such as one or more SIP telephone speakers and/or SIP-enabled loudspeakers which are configured to be in the zone.

The host-based approach has the advantages that the paging intelligence is hosted on the softswitch, along with other hosted packet-based Centrex and PBX functionality. Management of the paging services functionality can thus be integrated with the management of the other features, meaning consistency for the end-user, and in many cases, no extra customer premises equipment is needed over and above the SIP devices which may already be present. However, the host-based approach has the disadvantage that the paging service can use up valuable bandwidth resources to and from the customer premises. Bandwidth can be limited due, in particular, to bandwidth limitations on the communications link between the customer premises and the remote access network. It would therefore be desirable to provide media data delivery services without at least some of the drawbacks of the prior art.

SUMMARY OF CERTAIN INVENTIVE ASPECTS

In accordance with a first aspect of the present invention, there is provided, in a communications control system, a method for controlling delivery of media data to a plurality of target devices in a target network, the target network being connected to the communications control system via an access network, the method comprising:

storing target device group control data for controlling the transmission of media data to at least a first plurality of target devices in the target network;

receiving a media data delivery initiation request from a source device, the request comprising a target device group indicator;

retrieving target device group control data, from the stored target device group control data, based on the target device group indicator contained in the media data delivery initiation request; and transmitting a media data delivery initiation response to the source device, the response comprising the retrieved target device group control data, the retrieved target device group control data identifying at least one network address to which media data is to be transmitted by the source device, whereby to deliver media data to the first plurality of target devices.

In accordance with a second aspect of the present invention, there is provided a method for controlling delivery of media data to a plurality of target devices in a target network, the target network being connected to a communications control system via an access network, the communications control system comprising a store of target device group control data for controlling the transmission of media data to at least a first plurality of target devices in the target network, the stored target device group control data being retrievable based on target device group control indicators contained in media data delivery initiation requests, the method comprising, in the target network, the steps of:

transmitting a media data delivery initiation request to the communications control system, the request comprising a target device group indicator;

receiving a media data delivery initiation response from the communications control system, the response comprising target device group control data retrieved on the basis of the target device group indicator in the media data delivery initiation request, the retrieved target device group control data identifying at least one network address; and transmitting media data from the source device to the at one network address, whereby media data is delivered to the first plurality of target devices.

Hence, by use of the present invention, control of the delivery of media data from a source device to a plurality of target devices in a target network may be carried out remotely to the target network, but without the need for media data to pass out from or back into the target network via the access network.

In embodiments of the first and second aspects of the invention, the at least one network address comprises an address for which, when media data is transmitted to the address by the source device, media data is delivered to the target devices via the target network and not via the access network. Hence, using up valuable bandwidth resources between the target network and the access network may be avoided.

In embodiments of the invention, the first plurality of target devices are configured to associate a predetermined media data output mode with media data which is addressed to the at least one network address, when the media data is delivered to the configured target devices. Hence, when media data is delivered to a configured target device, it may act according to a predetermined media data output mode, for example to output the received media data immediately and without user intervention as audio via one or more loudspeakers. Where the target devices are telephone devices, the predetermined media data output mode is preferably a non-standard output mode, which may for example be to wait for the user to take the device off-hook before outputting audio. Embodiments of the invention using this type of functionality include a group paging service.

In embodiments of the invention, the method comprises, prior to transmittal of media data to the at least one network address, delivering a media data delivery alert message to one or more of the first plurality of target devices, wherein configuring of the first plurality of target devices occurs in response to receipt of the media data delivery alert message by the first plurality of target devices. Hence, a target device may be warned by an alert message to expect media data from a network address and configure itself accordingly, for example switching into a particular media data output mode.

In embodiments of the invention, the media data delivery alert message comprises a SIP INVITE message containing a SIP Alert-Info header. Hence, known SIP functionality may be applied to implement the alert messages of the present invention.

In embodiments of the invention, the media data delivery alert message comprises a source device identifier associated with the source device. Hence, a source device may be configured to act differently for media data received from different source devices, for example only outputting media data as audio if the media data is received from a source device identified in an alert message.

In embodiments of the invention, the at least one network address is identified in the media data delivery initiation response using the Session Description Protocol. Hence, known functionality of the SDP protocol may be employed to convey network addresses associated with media data delivery.

In embodiments of the invention, a group media data delivery mechanism is associated with the one network address, the group media data delivery mechanism being capable of delivering media data addressed to the one network address to the first plurality of target devices. Hence, media data may be transmitted by a source device to a network address associated with a group media data delivery mechanism, and the group media data delivery mechanism can then facilitate delivery of the media data on to multiple target devices in a group.

In embodiments of the invention, the group media data delivery mechanism comprises at least one of a broadcast mechanism, a multicast mechanism, an explicit multi-unicast mechanism, a peer-to-peer mechanism, a protocol for synchronous conferencing (PSYC) mechanism, and an Internet Relay Chat (IRC) mechanism.

Hence, embodiments of the present invention may employ a variety of group media data delivery mechanisms to achieve delivery of media data to groups of target devices.

In embodiments of the invention, the one network address has an associated plurality of ports at a node in the target network, and the group data delivery mechanism provides delivery of media data via the associated ports. Hence, media data transmitted to a network address may be delivered to multiple target devices via a plurality of ports, for example media data may be broadcast via all ports associated with a network address.

In embodiments of the invention, the method comprises registering one or more of the first plurality of target devices with a node in the target network in association with the one network address, the node being configured to provide the group media data delivery mechanism. Hence, a node in the target network may be responsible for administering a group media data delivery mechanism which provides delivery of media data to multiple target devices. For example, the node responsible for administering the group media data delivery mechanism may have one or more network addresses for use as multicast IP addresses. Target devices can register with the node in the target network in order to subscribe to the group media data delivery mechanism and thus have media data which is transmitted to one or more network addresses on the node delivered to them.

In embodiments of the invention, the method comprises registering the one or more of the first plurality of target devices prior to transmittal of the media data delivery initiation request. Hence, prior registration of target devices with the node in the target network responsible for administering the group media data delivery mechanism may take place, so that the target devices are ready to receive delivery of media data, helping to reduce delivery delays. Alternatively, registration may take place in response to receipt of a media data delivery initiation request.

In embodiments of the invention, the target network comprises an Ethernet switch, and the method comprises copying the media data to the first plurality of devices from the switch in response to receiving media data addressed to the one network address at the switch. Hence, the group media data delivery mechanism may be implemented using an Ethernet switch, for example broadcasting media data from all ports, or alternatively transmitting to one or more registered target devices.

In embodiments of the invention, the communications control system comprises a gateway interfacing with the access network, the gateway being configured to modify network addresses in responses transmitted to source devices, wherein when the media data delivery initiation response is transmitted from the communications control system, an exception is triggered in the gateway such that the gateway does not modify the network address identified in the response. Hence, a gateway such as a session border controller may be configured to treat group media data delivery responses differently to other messages so that the gateway does not replace its own network address and/or port in network addresses identified in the group media data delivery responses. This non-standard behaviour at the gateway facilitates delivery of media data to target devices without the need for the media data to pass out of and back into the target network.

In embodiments of the invention, the stored target device group control data comprises target device group control data for controlling the transmission of media data to a plurality of groups of target devices in the target network, wherein the media data delivery initiation request comprises a target device group indicator associated with a given group of target devices in the plurality of groups, and wherein the retrieved target device group control data is associated with the given group of target devices in the plurality, the retrieved target device group control data being selected from the store on the basis of the target device group indicator comprised in the request. Hence, a number of different groups of target devices may be supported, for example different groups of target devices in different paging zones in a customer premises. A user can request delivery of media data to a particular group by dialing an extension number or other such code associated with the group. The communications control system will then select the appropriate group control data from the stored target device group control data, for example by consulting a database, and inform the source device how delivery of media data to such a group of target devices may be achieved.

In embodiments of the invention, the stored target device group data comprises an associated port and network address for each group in the plurality, and the group media data delivery mechanism is capable of delivering media data addressed to the port and network address associated with a given group in the plurality to target devices in the given group. Hence, different groups of target devices may be associated with different network address and port pairs which allow delivery of media data to different groups of target devices, for example in different paging zones or suchlike. Groups may overlap, so that target devices may be part of more than one group so that they can be located in multiple paging zones.

In alternative embodiments of the invention, the retrieved target device group control data comprised in the response may identify a plurality of network addresses to which media data is to be transmitted by the source device. Hence, instead of employing a group media data delivery mechanism, a source device may deliver media data directly to multiple target devices.

In accordance with a third aspect of the present invention, there is provided computer software adapted to perform the method of the first and second aspects of the present invention.

In accordance with a fourth aspect of the present invention, there is provided a system for controlling delivery of media data to a plurality of target devices in a target network, the target network being connected to a communications control system via an access network, the system comprising a function for storing target device group control data, for controlling the transmission of media data to at least a first plurality of target devices in the target network; a function for transmitting a media data delivery initiation request from a source device, the request comprising a target device group indicator; a function for receiving the media data delivery initiation request at the communications control system; a function for retrieving target device group control data, from the stored target device group control data, based on the target device group indicator contained in the media data delivery initiation request; and a function for transmitting a media data delivery initiation response from the communications control system, the response comprising the retrieved target device group control data, the retrieved target device group control data identifying at least one network address to which media data is to be transmitted by the source device; a function for receiving the media data delivery initiation response at the source device; and a function for transmitting media data from the source device to the at least one network address, whereby the media data is delivered to the first plurality of target devices.

In accordance with a fifth aspect of the present invention, there is provided a method for processing messages at a session border controller in a telecommunications network, the method comprising: receiving a plurality of messages directed to a source device, the messages each identifying a destination address to which media data is to be delivered by the source device; modifying the destination address of one or more of the plurality of received messages to identify a network address of the session border controller as the modified destination address; and transmitting the one or more messages to the source device with the modified destination address; and transmitting one or more of the plurality of received messages with the destination address unmodified.

Hence, a session border controller may be configured to behave in a non-standard manner in relation to some messages it receives and in a standard manner to other messages it receives, so that an address with a special function can be passed by the session border controller unmodified without compromising the normal functioning of the session border controller. Such a configured session border controller may be employed in the other aspects of the present invention.

In embodiments of the invention, the received messages whose destination addresses are not modified are messages which are received identifying destination addresses to which media data is to be delivered by the source device which are within a predetermined range of destination addresses and/or one or more predetermined individual destination addresses. Hence, one or more addresses may be reserved for non-standard treatment by the session border controller. Non-standard behaviour of the session border controller may be triggered upon receipt of messages containing such reserved addresses.

In accordance with a sixth aspect of the present invention, there is provided a session border controller adapted to perform the method of the fifth aspect of the present invention.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 7A and 7B are flow diagrams showing media data delivery according to the prior art.

DETAILED DESCRIPTION OF CERTAIN INVENTIVE EMBODIMENTS

Figure 1:
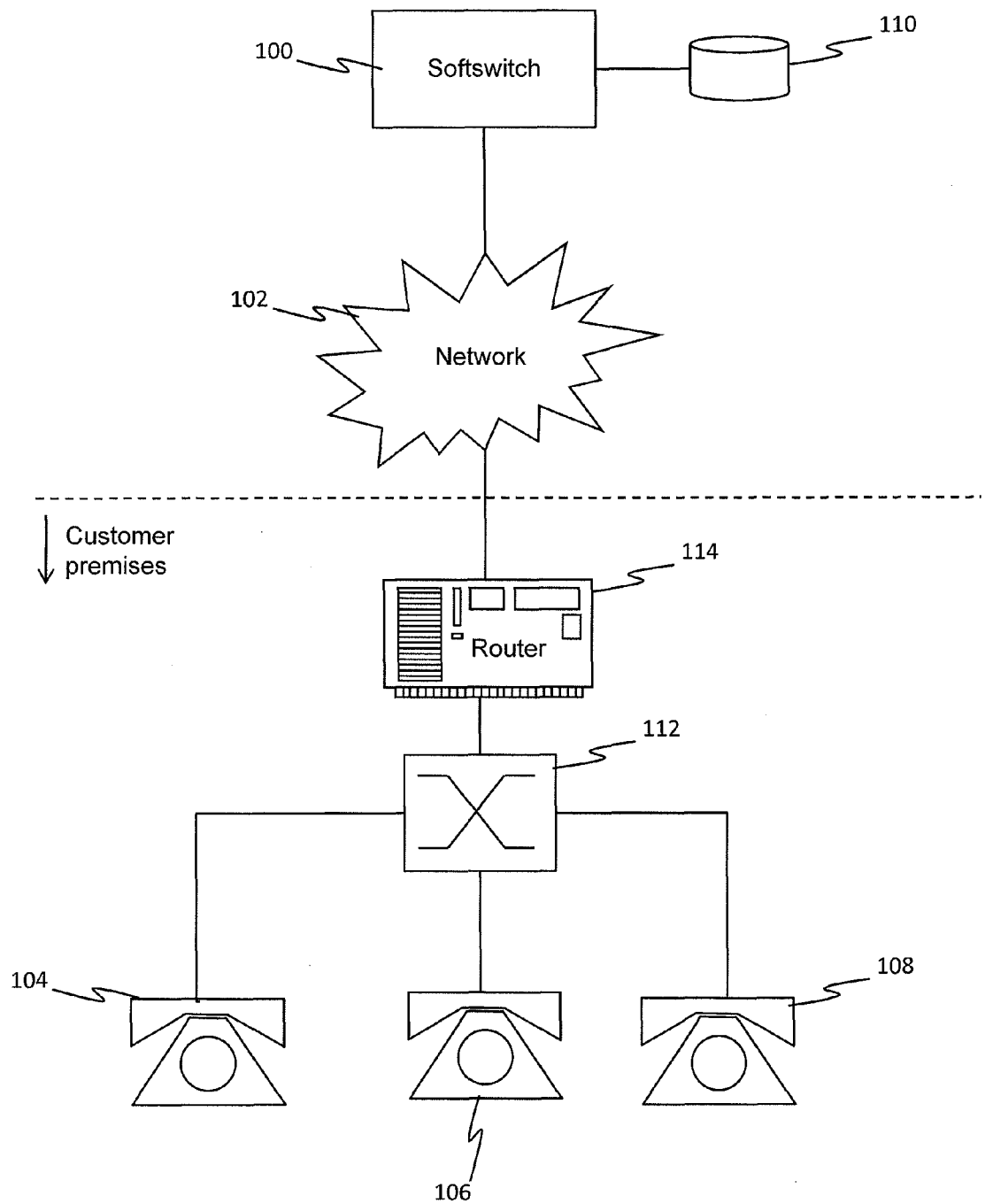
FIG. 1 shows a system diagram according to embodiments of the present invention.

FIG. 1 shows a system diagram according to an embodiment of the present invention. In this embodiment, a media data delivery service is hosted by a network entity 100 connected to an access network 102. The media data delivery service is provided to a number of devices 104, 106 and 108 which are also connected to access network 102. Network entity 100 interfaces with access network 102.

Access network 102 may include the Internet, the Public Switched Telephone Network (PSTN), one or more mobile telephone networks, or one or more private telecommunications networks, etc (not shown). Any of devices 104, 106 and 108 may be a source device or a target device, where a user of a source device wishes to deliver media data to a number of target devices. Devices 104, 106 and 108 may be SIP telephones or SIP loudspeakers which are capable of outputting media data. The media data may be output in the form of audio output in the case of a paging service.

Devices 104, 106 and 108 are located in a target network which connects to access network 102. The target network may be a local data communications network such as a local area network (LAN) located on a customer premises which covers a predetermined geographic area, such as an office, or group of buildings, etc. The target network includes a customer premises switch 112 and a customer premises router 114. Customer premises devices 104, 106 and 108 are connected to access network 102 via switch 112 and router 114. Switch 112 provides switching functionality for data flowing in the target network. Router 114 is an access or edge router which provides routing functionality for the target network, such as routing of incoming and outgoing packets into and out of the target network, and filtering of packets into and out of the target network, selection of connections and bit-rate for connecting to external networks, and keeping track of reachable destination IP addresses according to one or more routing protocols. Router 114 may also provide Network Address Translation (NAT) functionality for translating public Internet Protocol (IP) addresses, which are used outside the target network, into private IP addresses, which are used within the target network.

Target devices may be part of one or more groups or target devices, such that media data can be delivered to a group of target devices instead of individual target devices. A group of target devices may for example be formed by a number of devices in a particular zone in a customer premises, for example devices 104, 106 and 108 of FIG. 1. Groups of target devices may overlap so that a target device may form part of more than one group.

Figure 2:
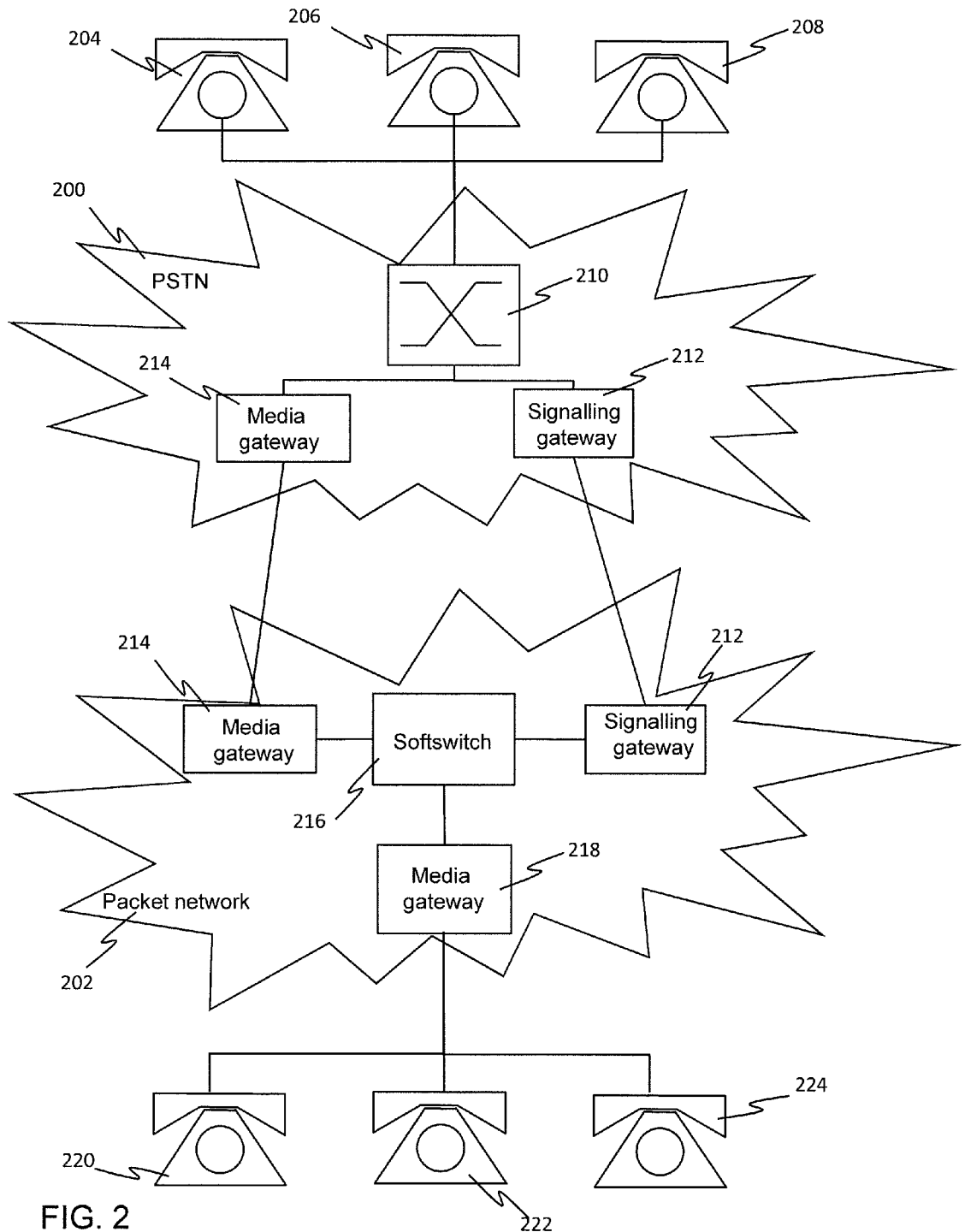
FIG. 2 shows a system diagram according to embodiments of the present invention.

FIG. 2 shows a system diagram according to the embodiments of the invention. FIG. 2 depicts call processing functionality of a softswitch 216 which could also be used to provide control of media data delivery according to the present invention, as per network entity 100 in FIG. 1.

In FIG. 2, softswitch 216 is located in a packet network 202 which is connected to PSTN 200 via media gateway 214 and signalling gateway 212. In PSTN 200, media gateway 214 and signalling gateway 212 interface with a local telephone exchange switch 210 which provides telephony services to and from telephony devices 204, 206 and 208. Media gateway 214 converts between the different protocols of media data passing between packet network 202 and PSTN 200 such as packetised Voice over Internet Protocol (VoIP) data into Time-Division-Multiplexing (TDM) voice data and vice versa. Signalling gateway 212 converts between the different protocols of signalling information passing between packet network 202 and PSTN 200 such as SIP signalling information into Signalling System 7 (SS7) signalling information and vice versa.

In packet network 202, media gateway 214 and signalling gateway 212 are controlled by softswitch 216. Softswitch 216 also provides control of telephony services to telephony devices 220, 222, and 224 via media gateway 218. Media gateway 218 provides any conversion of media data which may be required for devices 220, 222, and 224, although its function may be combined with media gateway 214. Media gateway 218 also operates under the control of softswitch 216.

Softswitch 216 may also be referred to as a media gateway controller or call agent. As well as conventionally providing the architecture for enabling conversion between both media data and signalling protocols via one or more media gateways and signalling gateways, such a softswitch may conventionally provide call processing intelligence for use in the selection of processes that can be applied to a call, routing for a call within a network based on signalling and subscriber database information, the ability to transfer control of a call to another network element and management functions such as provisioning, fault detection and billing.

Media gateway 214 and signalling gateway 212 are depicted in FIG. 2 as being two separate entities, one located in PSTN 200 and another located in packet network 202. However, media gateway 214 may in reality be a single entity located on the border between PSTN 200 and packet network 202. Similarly, signalling gateway 212 may in reality be a single entity located on the border between PSTN 200 and packet network 202. The function of media gateway 214 and signalling gateway 212 may be combined into a single entity. Further, the function of media gateways 214 and 218 and signalling gateway 212 may be carried out by softswitch 216 itself. For ease of explanation, it is hereafter assumed that softswitch 216 is one network entity, although in practice it may comprise a distributed set of entities.

Figure 3:
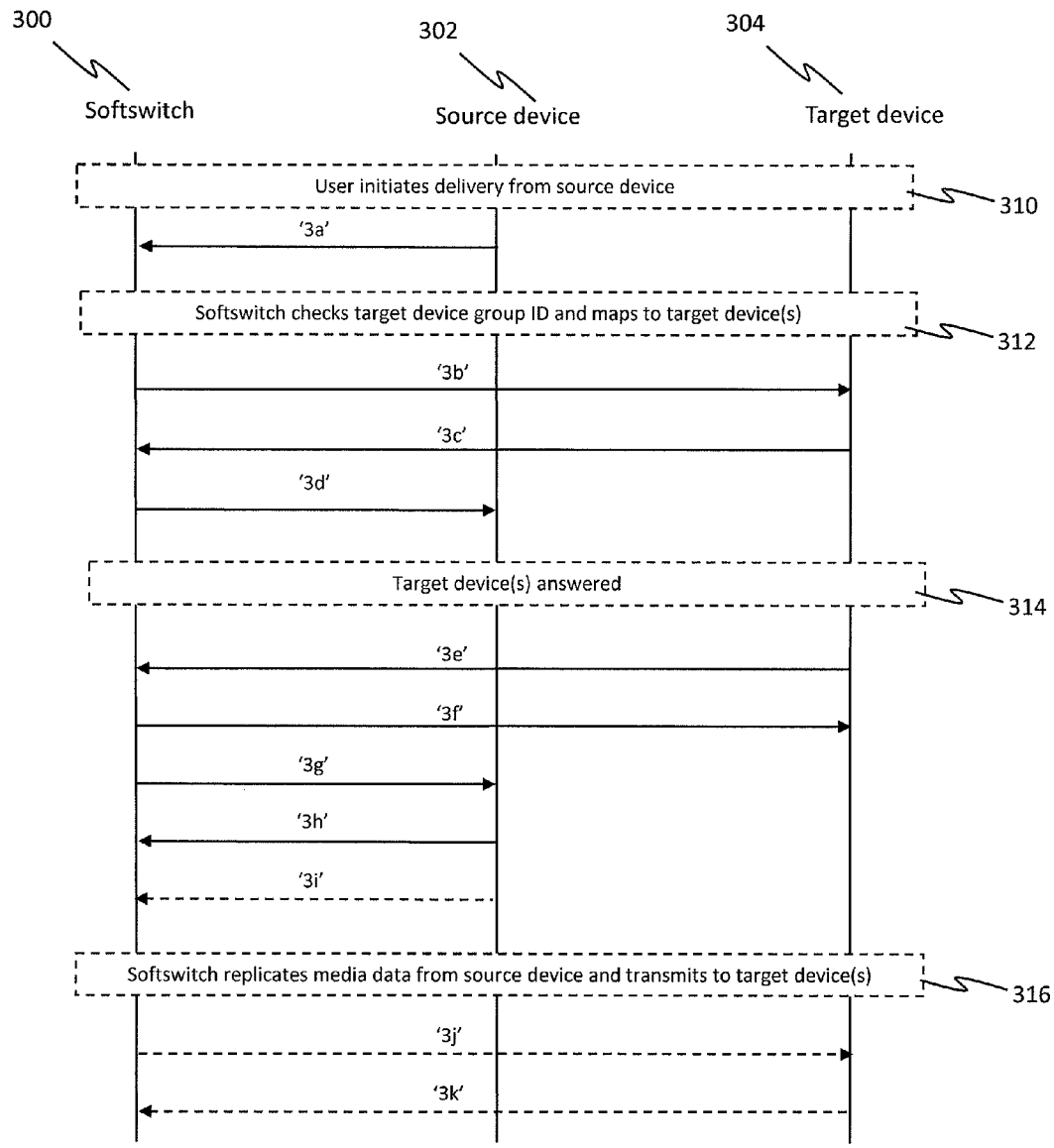
FIG. 3 is a flow diagram showing media data delivery according to the prior art.

FIG. 3 is a flow diagram showing media data delivery according to the prior art, which may use an arrangement of entities similar to that shown in FIGS. 1 and 2. FIG. 3 depicts a Session Initiation Protocol (SIP) environment where a source device 303 with IP address SP1 and a target device 304 with IP address SP2 are located in a target network, for example on a customer premises. Here, media data delivery is transferred using the Real-time Transport Protocol (RTP) and controlled by a softswitch 300 with IP address SW1 which is remote from the target network.

The process begins in step 310, when a user initiates delivery of media data to target device 304 by making a suitable input on source device 302 such as pressing a suitable button or dialing an extension number or suchlike. The user input triggers transmittal of a SIP Invite message, see step 3a, from source device 302 with IP address SP1 to softswitch 300 with IP address SW1. The step 3a SIP Invite message contains data identifying target device 304. The step 3a SIP Invite message also contains Session Description Protocol (SDP) data with IP address SP1, i.e. instructing softswitch 300 to send RTP media data to source device 302 at IP address SP1. In step 312, softswitch 300 determines the IP address SP2 of target device 304.

Softswitch 300 then sends a SIP Invite message, see step 3b, to target device 304 having IP address SP2. The step 3b SIP Invite message contains SDP data with IP address SW1, i.e. RTP media data should be sent to softswitch 300 at IP address SW1. In response, target device 304 transmits a SIP Response 180 Ringing message, see step 3c, to softswitch 300. Softswitch 300 sends a SIP Response 180 Ringing message to source device 302 in step 3d. Target device 304 is answered in step 314, and target device 304 sends a SIP Response 200 OK message, see step 3e, to softswitch 300 containing SDP data with IP address SP2, i.e. identifying target device 304 to which RTP media data should be sent. Softswitch 300 acknowledges receipt of the step 3e SIP Response 200 OK message by sending a SIP ACK message to target device 304 in step 3f.

Softswitch 300 now sends a SIP Response 200 OK message to source device 302, see step 3g, which contains SDP data identifying IP address SW1 of softswitch 300, i,e. instructing source device 302 to send RTP media data to softswitch 300 at IP address SW1. Source device 302 acknowledges receipt of the step 3g SIP Response 200 OK message by sending a SIP ACK message to softswitch 302 in step 3h. The above process can be repeated for each additional target device that media data is to be delivered, where message flows for each additional target device will be clear to one skilled in the art.

Source device 302 now sends RTP media data to softswitch 300 at IP address SW1, see step 3i. Softswitch 300 replicates the RTP media data, see step 316 and transmits to each target device in step 3j, in the form of multiple stream, flows or suchlike.

In the case of a paging environment, media data transmitted from target device 304 to softswitch 300, see step 3k, will not be forwarded to source device 302 as paging is generally a one-way operation.

It can be seen that the prior art system of FIG. 3 involves RTP media data passing out of the target network on the customer premises where the source and target devices are located in the form of a data flow or data stream. The prior art system of FIG. 3 also involves multiple RTP media streams passing back into the customer premises, one flow for each target device to which media data is to be delivered. Such RTP data flowing in and out of the customer premises can use up valuable bandwidth resources and is therefore undesirable.

Embodiments of the invention provide methods for controlling the delivery of media data from source devices to a plurality target devices in a target network which overcome the aforementioned disadvantages of the prior art. Embodiments of the present invention are implemented using the various entities depicted in FIGS. 1 and 2.

Media data delivery is controlled by a communications control system which is connected to the target network via network 102. The communications control system includes a softswitch 100 or other such computing device and a database 110. Softswitch 100 has access to database 110 which is used to store target device group control data for controlling the transmission of media data to target devices in the target network. The communications control system is able to control the delivery of media data to a plurality of target devices in the target network.

The stored target device group control data may include a list of target devices, which group or groups each target device is in, and for each group one or more network addresses in the target network to which media data should be transmitted in order that the media data is delivered to target devices in each group.

When a user of a source device requires media data to be delivered to a number of target devices, control of delivery of the media data by the communications control system begins when a user makes a suitable input to a source device, such as pressing an appropriate combination of buttons or suchlike. This causes a media data delivery initiation request to be transmitted by the source device to softswitch 100, preferably via switch 112, router 114 and network 102. The media data delivery initiation request includes data identifying the target device group which the user wants media data delivered to in the form of a target device group indicator. This may include a number or other such code associated with the target device group, for example 'Target device group 1' or 'Paging zone 1', etc.

The media data delivery initiation request is then received and processed by softswitch 100. Softswitch 100 accesses the stored target device group control data in database 110 and retrieves target device group data on the basis of the target device group indicator contained in the media data delivery initiation request. Softswitch 100 transmits a media data delivery initiation response back to the source device across network 102, preferably via router 114 and switch 112. The media data delivery initiation response includes at least one network address to which media data is to be transmitted by the source device. The source device can then transmit media data to the at least one network address in the target network and thereby achieve deliver of media data to the first plurality of target devices without the need for any media data to pass out of the customer premises or for multiple streams of media data to pass back into the customer premises. As delivery of media data occurs via the target network only and not via the access network, valuable bandwidth resources into and out of the customer premises are not used as in prior art systems.

The at least one network address may have an associated group media data delivery mechanism which allows delivery of media data addressed to the at least one network address to a plurality of target devices. The at least one network address may be an address in the target network, for example the address of a node in the target network such as switch 112, or an address hosted by the node, or an address and associated port on the node, etc. The node may for example be an Ethernet switch or suchlike. There may be more than one address on the node which can function in association with the group media data delivery mechanism.

The group media data delivery mechanism may include a broadcast mechanism where media data delivered to an address on the switch is copied and transmitted to all target devices in the target network, or all target devices in a subnet of the target network. Target devices which receive the media data can then chose whether to process the data and output it as audio via one or more integral or external loudspeakers, or discard the media data without outputting taking place.

The group media data delivery mechanism may further alternatively include a multicast mechanism, for example delivering media data transmitted to a multicast IP address to multiple target devices via a multicast IP protocol.

The group media data delivery mechanism may yet further alternatively include an Explicit Multi-Unicast (XCAST) mechanism, where instead of a designated multicast address, the unicast addresses of multiple target devices are used.

The group media data delivery mechanism may yet further alternatively include a peer-to-peer mechanism where media data is delivered via a peer-to-peer network of nodes. Yet further alternatively, an Internet Relay Chat (IRC) mechanism could be employed.

The group media data delivery mechanism may include a protocol for synchronous conferencing (PSYC) which may employ a mixture of unicast or multicast for delivering media data.

The network address used for the group media data delivery mechanism may have an associated port on a switch in the target network, so that media data is in fact delivered to a network address and associated port pair on the switch. Alternatively, there may be more than one port associated with a network address on the switch or even multiple ports on multiple switches. The group data delivery mechanism can then provide delivery of media data via the associated ports in conjunction with the network address on the switch. In the case of a broadcast mechanism, a switch in the target network may broadcast media data on all ports on the switch.

Multiple network addresses and ports on a switch may be employed in conjunction with the group data delivery mechanism, for example a different network address for each group of target devices, or a different group and associated port for each group of target devices.

The network address in the target network to which media data is to be delivered by a source device may be identified in a media data delivery initiation response using the SDP protocol.

To receive media data via the group data delivery mechanism, target devices may register in association with the network address on the switch in the target network. In this way, a target device can inform the switch that it wishes to receive delivery of media data which is transmitted to the switch via the group data delivery mechanism. The switch may be configured or configure itself accordingly so that delivery of media data to each registered target device can be achieved.

Registration of target devices and configuration of the switch may be carried out for one or more target devices before media data is transmitted to them. Alternatively, such registration and configuration may be carried out when a new target device is added to the network, or 'on-the-fly' as and when delivery of media data to a particular target device is required.

Target devices may be configured to associate a predetermined media data output mode with media data which is addressed to a network address being used in association with the group media data delivery mechanism. In this way, when a target device receives media data via the group data delivery mechanism, it may process the media data according to an associated output mode. Such predetermined media data output modes may for example include a group paging output mode, or a Push-to-Talk output mode, or suchlike.

A group paging output mode may have 'auto-play' functionality where the media data is automatically output as audio via one or more loudspeakers on or accessible by a target device without the need for human intervention at the target device (such as picking up the receiver or pressing a button). Such an auto-play output mode may be disabled by a user if for some reason they do not wish to by disturbed by any such audio output, for example if they are in a meeting or conducting a telephone call.

Configuration of output modes on a target device may occur in response to receipt of a media data delivery alert message. Such an alert message may be transmitted by softswitch 100 to a target device to warn the target device to expect delivery of media data in the near future. This allows a target device to immediately output the media data as audio upon receipt of the media data via the group data delivery mechanism. A media data delivery alert message may include a SIP INVITE message containing a SIP Alert-Info header with appropriate data content to instruct the target device.

A media alert message may include a source device identifier such as a calling line identifier (CLI) associated with a source device. A media data output mode on a target device may involve a target device being configured to respond differently to media data identified from a source device identifier as being transmitted from different source devices, for example auto-playing media data identified as being sourced from one source device, but not auto-playing media data from other source devices.

Embodiments of the present invention may involve storing target device group control data for controlling the transmission of media data to a plurality of groups of target devices in the target network. Such data may be stored in database 110 and be accessible by softswitch 100. A media data delivery initiation request may include a target device group indicator associated with a given group of target devices in the plurality of groups and the softswitch may then select which target device group control data to retrieve from the database on the basis of target device group indicator in the request, i.e. target device group control data associated with the given group. Each group in the plurality of groups of target devices may have an associated port and network address to which media data may be transmitted and used by the group media data delivery mechanism to deliver the media data to each target device in a group.

Figure 4:
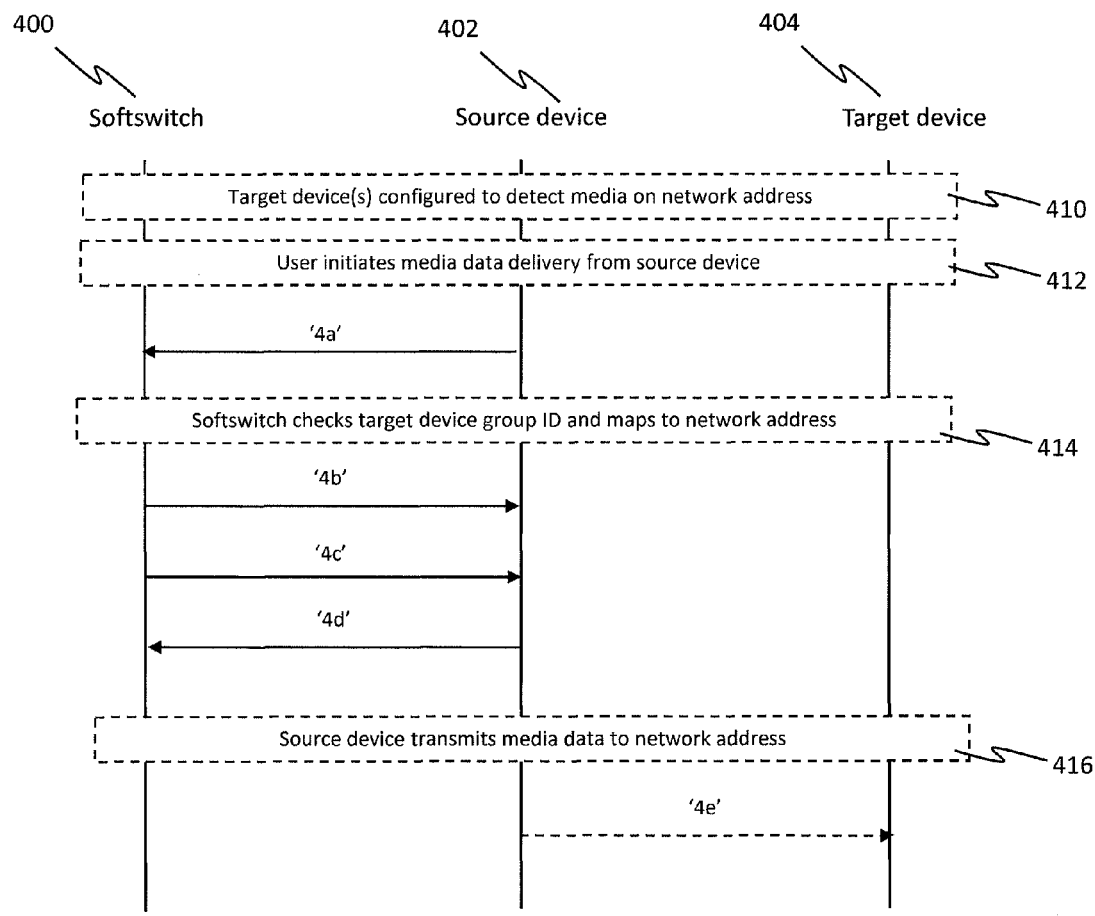
FIG. 4 is a flow diagram showing media data delivery according to an embodiment of the present invention.

FIG. 4 is a flow diagram showing media data delivery according to an embodiment of the present invention. The delivery process may be carried out using the various entities depicted in FIGS. 1 and 2.

FIG. 4 shows a Session Initiation Protocol (SIP) environment where a source device 402 with IP address SP1 and a target device 404 with IP address SP2 in a target network, for example located on a customer premises. The media data being delivered is transferred using the Real-time Transport Protocol (RTP), delivery of which is controlled by a softswitch 400 with IP address SW1 which is remote from the target network.

In step 410, target device 404 is configured to detect media data on a network address associated with the group media data delivery mechanism. Such configuration may involve target device 404 registering with a switch (such as switch 112 in FIG. 1) in the target network so that media data transmitted to the switch on a network address associated with the group media data delivery mechanism will be delivered to target device 404.

In step 412, a user initiates delivery of media data to target device 404 by making a suitable input on source device 402. The user input triggers transmittal of a media data delivery initiation request in the form of a SIP Invite message, see step 4a, from source device 402 with IP address SP1 to softswitch 400 with IP address SW1. The step 4a SIP Invite message contains a target device group indicator, in this case identifying target device 404 (or a group of target devices which target device 404 is part of). The step 4a SIP Invite message also contains Session Description Protocol (SDP) data with IP address SP1, i.e. instructing softswitch 400 to send RTP media data to source device 402 at IP address SP1. In step 414, softswitch 400 consults a database (see softswitch 100 and database 110 in FIG. 1) to check that the request to deliver media data to target device 404 is valid by searching the database for a group of target devices corresponding to the target device group indicator contained in the media data delivery initiation request of step 4a. When a corresponding entry in the database is found, softswitch 400 retrieves the network address associated with the group media data delivery mechanism for that group of target devices (in this case, the group of target devices is depicted as a single target device 404 in FIG. 4).

Softswitch 400 then sends a SIP Response 180 Ringing message, see step 4b, to source device 404 having IP address SP2.

Softswitch 400 also sends a media data delivery initiation response in the form of a SIP Response 200 OK message, see step 4c, to source device 404 containing data identifying network address M1 in the target network associated with a group media data delivery mechanism, i.e. SDP data with IP address M1 associated with the group media data delivery mechanism, for example a multicast IP address provided and supported by switch 112. Source device 402 acknowledges receipt of the step 4c SIP Response 200 OK message by sending a SIP ACK message to softswitch 400 in step 4d.

The source device now transmits media data to IP address M1 for which target device 404 is configured to receive media from. Media data, for example RTP data associated with picked-up speech of a user of source device 402, is then delivered from source device 402 having IP address SP1 to target device 404 having IP address SP2 via IP address M1 associated with the group media data delivery mechanism. If target device 404 is configured in a media output mode which allows 'auto-play', the RTP media data can be played as audio by target device 404 approximately in real-time as the RTP media is received. Other target devices configured to receive media data from IP address M1 via the group media data delivery mechanism will likewise receive the RTP media data.

It can be seen that the embodiment of the present invention of FIG. 4 does not involve any RTP media data passing out of or back into the customer premises. All RTP media data thus stays within the target network itself, so valuable bandwidth resources into and out of the target premises are advantageously not used up by employing the present invention.

Figure 5:
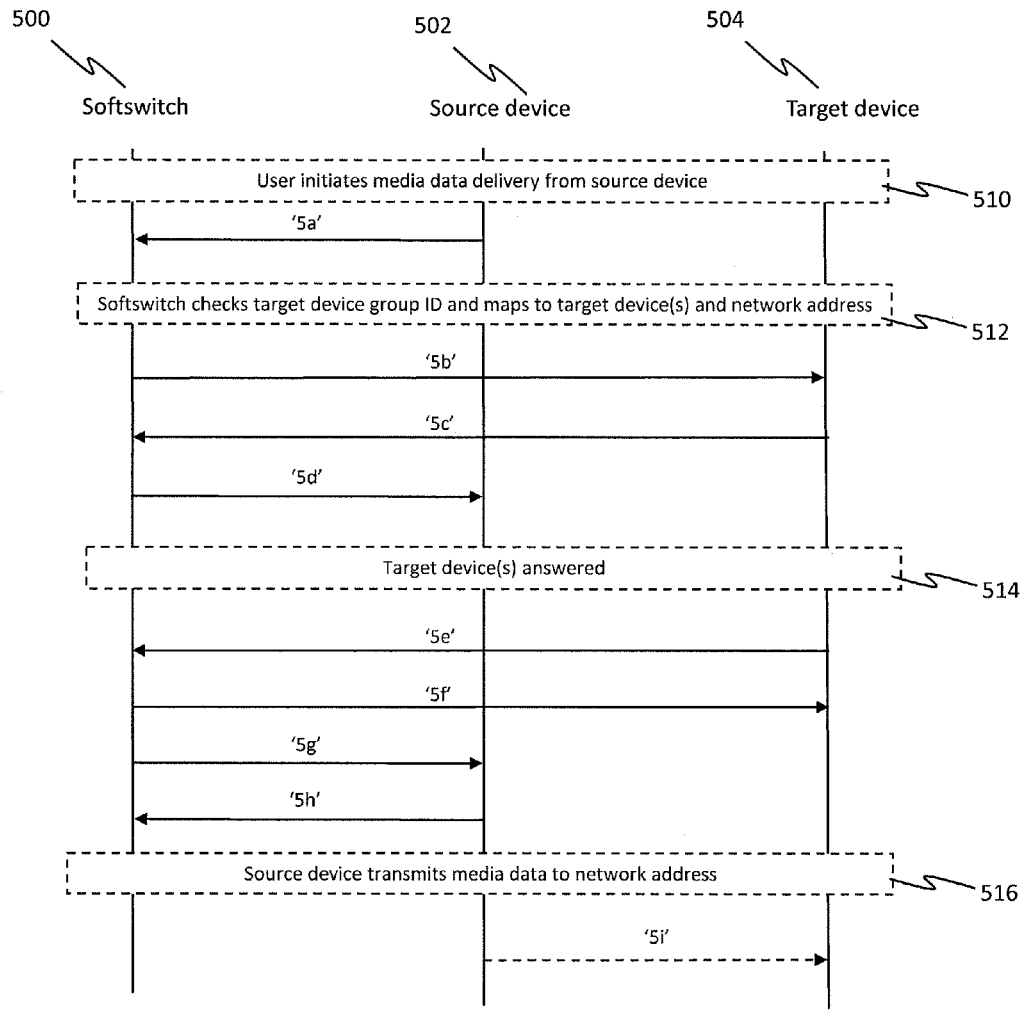
FIG. 5 is a flow diagram showing a media data delivery according to an embodiment of the present invention.

FIG. 5 is a flow diagram showing media data delivery according to an embodiment of the present invention. The delivery process may be carried out using the various entities depicted in FIGS. 1 and 2.

Similarly to FIG. 4, FIG. 5 shows a Session Initiation Protocol (SIP) environment where a source device 502 with IP address SP1 and a target device 504 with IP address SP2 in a target network, for example located on a customer premises. The media data being delivered is transferred using the Real-time Transport Protocol (RTP), delivery of which is controlled by a softswitch 500 with IP address SW1 which is remote from the customer premises. With the embodiment of FIG. 5 however, no prior configuration of the target device to enable it to detect media data on a network address associated with the group media data delivery mechanism is required.

In step 510, a user initiates delivery of media data to target device 504 by making a suitable input on source device 502. The user input triggers transmittal of a media data delivery initiation request in the form of a SIP Invite message, see step 5a, from source device 502 with IP address SP1 to softswitch 500 with IP address SW1. The step 5a SIP Invite message contains a target device group indicator, in this case identifying target device 504 (or a group of target devices which target device 504 is part of). The step 5a SIP Invite message also contains Session Description Protocol (SDP) data with IP address SP1. In step 512, softswitch 500 consults a database (see softswitch 100 and database 110 in FIG. 1) to check that the request to deliver media data to target device 504 is valid by searching the database for a group of target devices corresponding to the target device group indicator contained in the media data delivery initiation request of step 5a. When a corresponding entry in the database is found, softswitch 500 retrieves the network address associated with the group media data delivery mechanism for that group of target devices, and IP addresses for the target devices in the group (in this case, the group of target devices is depicted as a single target device 504 in FIG. 5).

Softswitch 500 sends a media data delivery alert message in the form of a SIP Invite message, see step 5b, to target device 504 having IP address SP2 containing data identifying network address M1 in the target network associated with a group media data delivery mechanism. The step 5b SIP Invite message contains SDP data with IP address M1 associated with the group media data delivery mechanism, i.e. instructing target device 504 to detect RTP media data at IP address M1. M1 may for example be a multicast IP address provided and supported by switch 112, in which case, target device 504 can register with switch 112 in order to have media data transmitted to multicast IP address M1 delivered to target device 504.

Target device 504 having IP address SP2 then sends a SIP Response 180 Ringing message, see step 5c, to softswitch 500 having IP address SW1. Softswitch 500 sends a SIP Response 180 Ringing message to source device 502 in step 5d.

Target device 504 is answered in step 514, the process by which this occurs will be described in more detail below.

Once target device 504 has been answered, target device 504 sends a SIP Response 200 OK message, see step 5e, to softswitch 500. The step 5e SIP Response 200 OK message does not contain any SDP data identifying an IP address, as target device 504 is only to receive RTP media data. Softswitch 500 acknowledges receipt of the step 5e SIP Response 200 OK message by sending a SIP ACK message to target device 504 in step 5f.

Softswitch 500 now sends a media data delivery initiation response in the form of a SIP Response 200 OK message, see step 5g, to source device 502 containing data identifying network address M1 in the target network associated with a group media data delivery mechanism. The step 5g SIP Response 200 OK message contains SDP data with IP address M1 associated with the group media data delivery mechanism, i.e. instructing source device 502 to send RTP media data to IP address M1. M1 may for example be a multicast IP address provided and supported by switch 112. Source device 502 acknowledges receipt of the step 5g SIP Response 200 OK message by sending a SIP ACK message to softswitch 500 in step 5h.

Source device 502 can now transmit media data to IP address M1, see step 516, for which target device 504 is expecting to receive media from. Media data, for example RTP data associated with picked-up speech of a user of source device 502, is then delivered, see step 5i, from source device 502 having IP address SP1 to target device 504 having IP address SP2 via IP address M1 associated with the group media data delivery mechanism.

If the step 5a SIP Invite message contains a target device group indicator associated with a group of target devices, other target devices in the identified group may similarly receive media data from source device 502 via address M1 and its associated group media data delivery mechanism. Such media data will include multiple RTP media streams, although all such RTP streams will only travel within the target network.

The way in which target device 504 is answered in step 514 may be carried out using a number of embodiments of the present invention. One such embodiment involves the media data delivery alert message of step 5b, which could be in the form of a SIP Invite message containing a SIP Alert-Info header. When target device 504 receives the media data delivery alert message of step 5b, target device 504 knows that media data is soon to be transmitted to IP address M1 and can proceed to configure itself accordingly.

In the case of M1 being an multicast IP address, target device 504 can register to receive data that is transmitted to multicast IP address M1, for example with switch 112 of FIG. 1. Target device 504 can be configured into an 'auto-play' media data output mode where media delivered from multicast IP address M1 is automatically output via one or more loudspeakers.

In the case of M1 being a broadcast address, target device 504 will receive media data transmitted to broadcast address M1 (along with all other target devices in the target network or subnet thereof) without any registration being required. Target device 504 can be configured into an 'auto-play' media data output mode vis-à-vis broadcast address M1.

The media data delivery alert message of step 5b may also include a source identifier associated with source device 502, in which case target device 504 can be configured into an 'auto-play' media data output mode where media data delivered from IP address M1 is only output via one or more loudspeakers if the media data is delivered from a source device corresponding to that identified in the source identifier.

It should be noted that in the above embodiments relating to answering of target device 504, the SIP Response 180 Ringing messages of steps 5c and 5d may not be necessary.

It can be seen that the embodiment of the present invention depicted in FIG. 5 does not involve any RTP media data passing out of or back into the customer premises. All RTP media data thus stays within the target network itself, so valuable bandwidth resources into and out of the target premises are advantageously not used up by employing the present invention.

Figure 6:
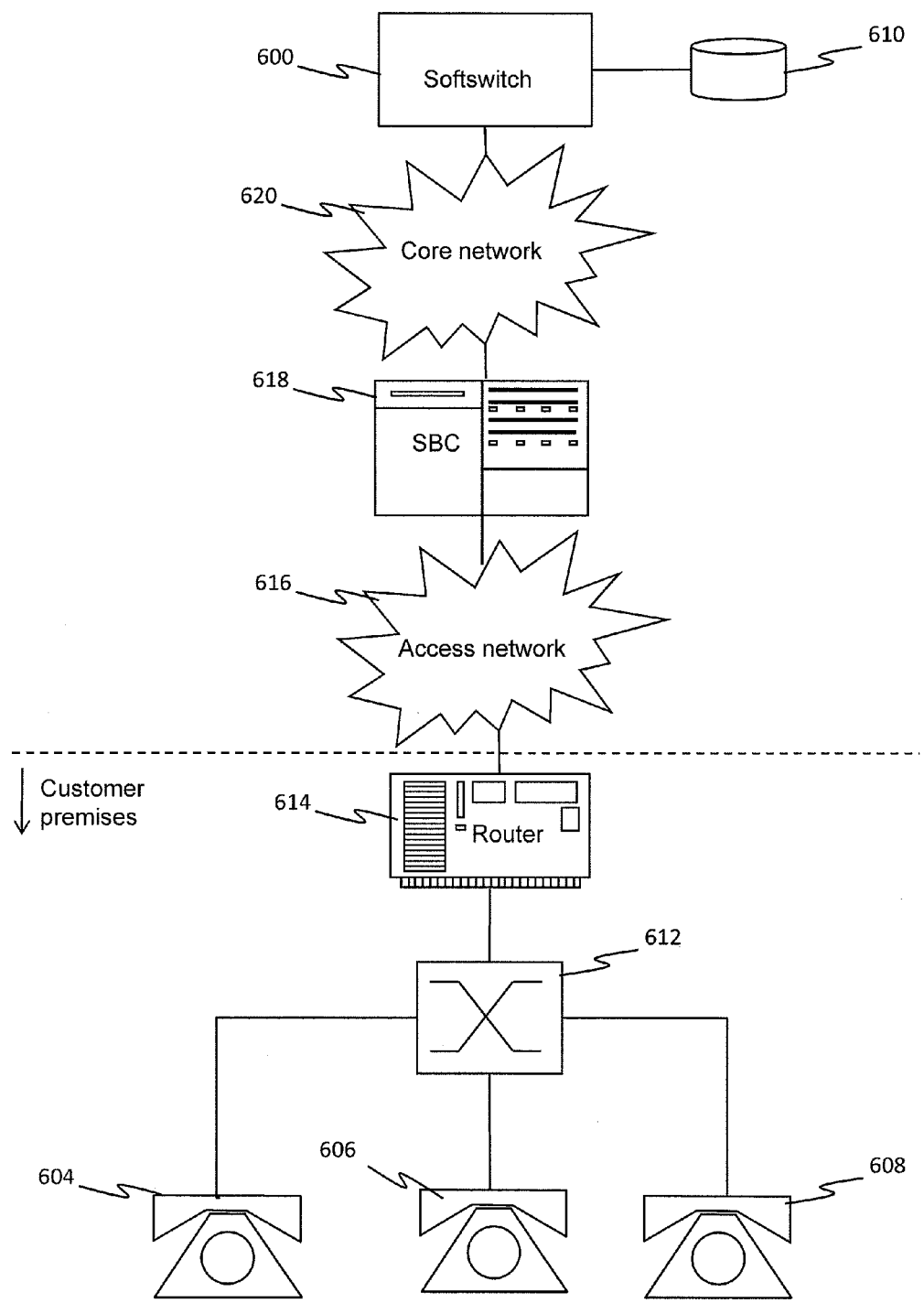
FIG. 6 shows a system diagram according to embodiments of the present invention.

FIG. 6 shows a system diagram according to embodiments of the present invention. In these embodiments, a media data delivery service is hosted by a communications control system, including a network entity such as a softswitch 600, a database 610, connected to a gateway 618 such as a session border controller via a core network 620. Core network 620 which connects softswitch 600 to gateway 618 may be located on a network provided by a service provider, such as that hosting media data delivery services.

Gateway 618 is connected to an access network 616, which in turn connects to a target network, with media data delivery services being provided to a number of devices 604, 606 and 608 located in the target network. Gateway 616 acts as an interface between core network 620 and access network 616 and facilitates the transfer of media data and signalling information between the two networks. Access network 616 may include the Internet, the Public Switched Telephone Network (PSTN), one or more mobile telephone networks, etc (not shown).

Any of devices 604, 606 and 608 may be a source device or a target device, where a user of a source device wishes to deliver media data to a number of target devices. Devices 604, 606 and 608 may be SIP telephones or SIP loudspeakers which are capable of outputting media data, for example in the form of audio output.

The target network may be a local data communications network such as a local area network (LAN) located on a customer premises which covers a relatively small geographic area, such as an office, or group of buildings, etc. The target network includes a switch 612 and a router 614. Devices 604, 606 and 608 are connected to access network 616 via switch 612 and router 614. Switch 612 provides switching functionality for data flowing within the target network. Router 614 provides routeing functionality in and out of the target network, such as Network Address Translation (NAT) functionality. Similarly to FIG. 1, target devices may be formed into groups of target devices which may overlap so that a target device may form part of more than one group.

Figure 7A:
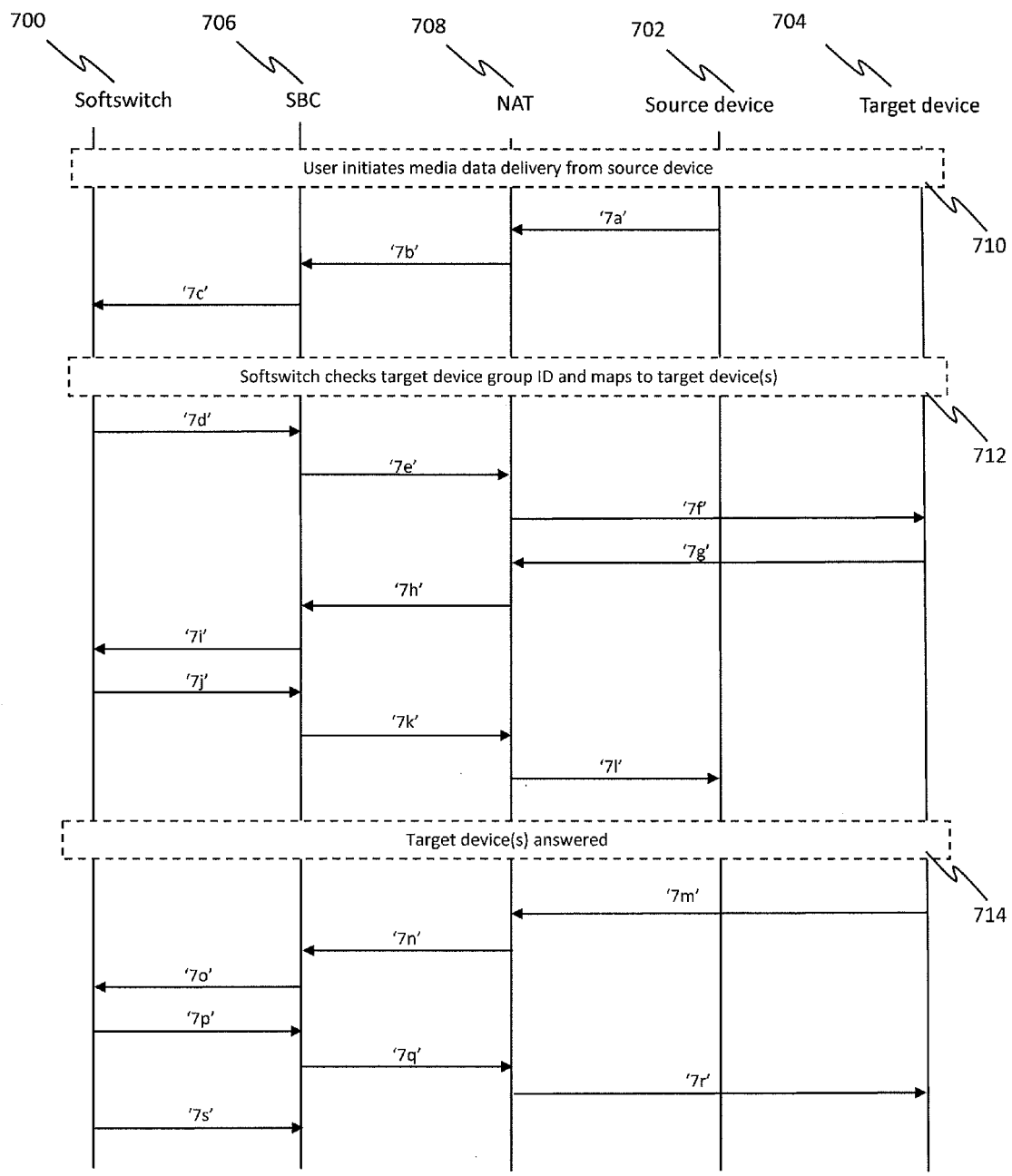

FIGS. 7A and 7B are a flow diagram showing media data delivery according to the prior art. The delivery process may be carried out using an arrangement of various entities similar to that depicted in FIG. 6.

FIGS. 7A and 7B depict a Session Initiation Protocol (SIP) environment where a source device 702 with IP address SP1 and a target device 704 with IP address SP2 are located in a target network, for example on a customer premises. Here, media data delivery is transferred using the Real-time Transport Protocol (RTP) and controlled by a softswitch 700 with IP address SW1 which is remote from the target network. Data passes between softswitch 700 and the target network via a session border control 706 and a NAT router 708. The session border controller facilitates the transfer of data between a core network in which softswitch 700 is located and a public access network which connects to the target network In FIGS. 7A and 7B (and also FIGS. 8, 9A and 9B below), the softswitch and source and target devices each only have one IP address. The SBC and NAT router, however, each have two IP addresses. In the case of the SBC it has one IP address on the softswitch side, i.e. an internal IP address, and one on the side facing the public access network side, i.e. an external IP address. In the case of the NAT router, it has one IP address on the target network side i.e. an internal IP address, and one on side facing the public access network side, i.e. an external IP address.

The process begins in step 7/0, when a user initiates delivery of media data to target device 704 by making a suitable input on source device 702 such as pressing a suitable button or dialing an extension number or suchlike. The user input triggers transmittal of a SIP Invite message, see step 7a, from source device 702 with IP address SP1 to the external IP address SBC01 of SBC 706 (the external side of SBC 706 being the side interfacing with the public access network). The step 7a SIP Invite message contains data identifying target device 704. The step 7a SIP Invite message also contains Session Description Protocol (SDP) data with IP address SP1, i.e. instructing softswitch 700 to send RTP media data to source device 702 at IP address SP1.

The step 7a SIP Invite message is received by NAT router 708 which modifies the IP sender address from that of source device 702 before sending on to SBC 706 in a SIP Invite message, see step 7b. This modification of IP sender address (the 'from' field) involves modifying the sender address from that of source device 702, i.e. SP1, to the external IP address of NAT router 708, which in this case is NAT01 (the external side of NAT router 708 being the side interfacing with the public access network). No modifications are made to the SDP data.

The step 7b SIP Invite message is received by SBC 706 which modifies the IP sender address, the IP destination address, and also the SDP data contained in the message, before sending on to softswitch 700 in a SIP Invite message, see step 7c. The modification of IP sender address involves modifying the sender address from the external IP address of NAT router 708, i.e. NAT01, to the internal IP address of SBC 706, which in this case is SBCSW1 (the internal side of SBC 706 being the side interfacing with the service provider core network). The modification of IP destination address involves modifying the destination address from the external IP address of SBC 706, i.e. SBC01, to the IP address of softswitch 700, which in this case is SW1. The SDP data modification involves changing the SDP data to identify the internal IP address of SBC 706, i.e. SBCSW1, rather than the IP address SP1 of source device 702.

In step 7l2, softswitch 700 determines the IP address SP2 of target device 704.

Softswitch 700 then sends a SIP Invite message, see step 7d, addressed to the internal IP address of SBC 706, i.e. SBCSW1. The step 7d SIP Invite message contains SDP data with IP address SW1, i.e. RTP media data should be sent to softswitch 700 at IP address SW1.

The step 7d SIP Invite message is received by SBC 706 which modifies the IP sender address, the IP destination address, and also the SDP data contained in the message before sending on to NAT router 708 in a SIP Invite message, see step 7e. The modification of IP sender address involves modifying the sender address from the IP address of softswitch 700, i.e. SW1, to the external IP address of SBC 706, i.e. SBC01. The modification of IP destination address involves modifying the destination address from the internal IP address of SBC 706, i.e. SBCSW01, to the external IP address of NAT router 708, i.e. NAT01. The SDP data modification involves changing the SDP data to identify the external IP address of SBC 706, i.e. SBC011, rather than the IP address of softswitch SW1.

The step 7e SIP Invite message is received by NAT router 708 which modifies the IP sender address and the IP destination address before sending on to target device 704 in a SIP Invite message, see step 7f. The modification of IP sender address involves modifying the sender address from the external IP address of SBC 706, i.e. SBC01, to the internal IP address of NAT router 708, which in this case is NATSP1. The modification of IP destination address involves modifying the destination address from the external IP address of NAT router 708, i.e. NAT01, to the IP address of target device 704, SP2. No modifications are made to the SDP data.

In response, target device 704 transmits a SIP Response 180 Ringing message, see step 7g, addressed to the external IP address of SBC 706, i.e. SBC01. The step 7g SIP Response 180 Ringing message does not contain any SDP data.

The step 7g SIP Response 180 Ringing message is received by NAT router 708 which modifies the IP sender address before sending on to SBC 706 in a SIP Response 180 Ringing message, see step 7h. This modification of IP sender address involves modifying the sender address from that of target device 704, i.e. SP2, to the external IP address of NAT router 708, i.e. NAT01.

The step 7h SIP Response 180 Ringing message is received by SBC 706 which modifies the IP sender address and the IP destination address, before sending on to softswitch 700 in a SIP Response 180 Ringing message, see step 7i. The modification of IP sender address involves modifying the sender address from the external IP address of NAT router 708, i.e. NAT01, to the internal IP address of SBC 706, i.e. SBCSW1. The modification of IP destination address involves modifying the destination address from the external IP address of SBC 706, i.e. SBC01, to the IP address of softswitch 700, i.e. SW1.

Softswitch 700 then sends a SIP Response 180 Ringing message, see step 7j, addressed to the internal IP address of SBC 706, i.e. SBCSW1.

The step 7j SIP Response 180 Ringing message is received by SBC 706 which modifies the IP sender address and the IP destination address, before sending on to NAT router 708 in a SIP Response 180 Ringing message, see step 7k. The modification of IP sender address involves modifying the sender address from the IP address of softswitch 700, i.e. SW1, to the external IP address of SBC 706, i.e. SBC01. The modification of IP destination address involves modifying the destination address from the internal IP address of SBC 706, i.e. SBCSW01, to the external IP address of NAT router 708, i.e. NAT01.

The step 7k SIP Response 180 Ringing message is received by NAT router 708 which modifies the IP sender address and the IP destination address before sending on to target device 704 in a SIP Response 180 Ringing message, see step 7l. The modification of IP sender address involves modifying the sender address from the external IP address of SBC 706, i.e. SBC01, to the internal IP address of NAT router 708, i.e. NATSP1. The modification of IP destination address involves modifying the destination address from the external IP address of NAT router 708, i.e. NAT01, to the IP address of source device 702, SP1.

Target device 704 is answered in step 7l4, and target device 704 sends a SIP Response 200 OK message, see step 7m, addressed to the external IP address of SBC 706, i.e. SBC01. The step 7m SIP Response 200 OK message contains SDP data with IP address SP2, i.e. identifying target device 704 to which RTP media data should be sent.

The step 7m SIP Response 200 OK message is received by NAT router 708 which modifies the IP sender address from that of target device 702 before sending on to SBC 706 in a SIP Response 200 OK message, see step 7n. This modification of IP sender address involves modifying the sender address from that of target device 704, i.e. SP2, to the external IP address of NAT router 708, i.e. NAT01. No modifications are made to the SDP data.

The step 7n SIP Response 200 OK message is received by SBC 706 which modifies the IP sender address, the IP destination address, and also the SDP data contained in the message, before sending on to softswitch 700 in a SIP Response 200 OK, see step 7o. The modification of IP sender address involves modifying the sender address from the external IP address of NAT router 708, i.e. NAT01, to the internal IP address of SBC 706, i.e. SBCSW1. The modification of IP destination address involves modifying the destination address from the external IP address of SBC 706, i.e. SBC01, to the IP address of softswitch 700, i.e. SW1. The SDP data modification involves changing the SDP data to identify the internal IP address of SBC 706, i.e. SBCSW1, rather than the IP address SP2 of source device 704.

Softswitch 700 acknowledges receipt of the step 7o SIP Response 200 OK message by sending a SIP ACK message, see step 7p, addressed to the internal IP address of SBC 706, i.e. SBCSW1. The step 7p SIP ACK message is received by SBC 706 which modifies the IP sender address and the IP destination address before sending on to NAT router 708 in a SIP ACK message, see step 7q. The modification of IP sender address involves modifying the sender address from the IP address of softswitch 700, i.e. SW1, to the external IP address of SBC 706, i.e. SBC01. The modification of IP destination address involves modifying the destination address from the internal IP address of SBC 706, i.e. SBCSW01, to the external IP address of NAT router 708, i.e. NAT01. The step 7q SIP ACK message is received by NAT router 708 which modifies the IP sender address and the IP destination address before sending on to target device 704 in a SIP ACK message, see step 7r. The modification of IP sender address involves modifying the sender address from the external IP address of SBC 706, i.e. SBC01, to the internal IP address of NAT router 708, i.e. NATSP1. The modification of IP destination address involves modifying the destination address from the external IP address of NAT router 708, i.e. NAT01, to the IP address of target device 704, SP2.

Softswitch 700 now sends a SIP Response 200 OK message, see step 7s, addressed to the internal IP address of SBC 706, i.e. SBCSW1. The step 7s SIP 200 OK message contains SDP data with IP address SW1, i.e. RTP media data should be sent to softswitch 700 at IP address SW1.

The step 7s SIP Response 200 OK message is received by SBC 706 which modifies the IP sender address, the IP destination address, and SDP data before sending on to NAT router 708 in a SIP Response 200 OK message, see step 7t. The modification of IP sender address involves modifying the sender address from the IP address of softswitch 700, i.e. SW1, to the external IP address of SBC 706, i.e. SBC01. The modification of IP destination address involves modifying the destination address from the internal IP address of SBC 706, i.e. SBCSW01, to the external IP address of NAT router 708, i.e. NAT01. The SDP data modification involves changing the SDP data to identify the external IP address of SBC 706, i.e. SBC01, rather than the IP address of softswitch SW1.

The step 7t SIP Response 200 OK message is received by NAT router 708 which modifies the IP sender address and the IP destination address before sending on to target device 704 in a SIP Response 200 OK message, see step 7u. The modification of IP sender address involves modifying the sender address from the external IP address of SBC 706, i.e. SBC01, to the internal IP address of NAT router 708, i.e. NATSP1. The modification of IP destination address involves modifying the destination address from the external IP address of NAT router 708, i.e. NAT01, to the IP address of source device 702, SP1.

Source device 702 acknowledges receipt of the step 7u SIP Response 200 OK message by sending a SIP ACK message, see step 7v, addressed to the external IP address of SBC 706, i.e. SBC01. The step 7v SIP ACK message is received by NAT router 708 which modifies the IP sender address from that of target device 702 before sending on to SBC 706 in a SIP ACK message, see step 7w. This modification of IP sender address involves modifying the sender address from that of source device 704, i.e. SP1, to the external IP address of NAT router 708, i.e. NAT01.

The step 7w SIP ACK message is received by SBC 706 which modifies the IP sender address and the IP destination address before sending on to softswitch 700 in a SIP ACK message, see step 7x. The modification of IP sender address involves modifying the sender address from the external IP address of NAT router 708, i.e. NAT01, to the internal IP address of SBC 706, i.e. SBCSW1. The modification of IP destination address involves modifying the destination address from the external IP address of SBC 706, i.e. SBC01, to the IP address of softswitch 700, i.e. SW1.

The above process can be repeated for each additional target device that media data is to be delivered to, where message flows for each additional target device will be clear to one skilled in the art.

Source device 702 now sends RTP media data to softswitch 700 via NAT router 708 and SBC 706, see steps 7y (from SP1 to SBC01), 7z (from NAT01 to SBC01), and 7aa (from SBCSW1 to SW1), with the relevant IP address modifications being made accordingly by NAT router 708 and SBC 706.

Softswitch 700 replicates the RTP media data, see step 7/6, and transmits to each target device via SBC 706 and NAT router 708, see steps 7bb (from SW1 to SBCSW1), 7cc (from SBC01 to NAT01) and 7dd (from NATSP1 to SP2), with the relevant sender and destination IP address modifications being made accordingly by SBC 706 and NAT router 708.

In the case of a paging environment, media data transmitted from target device 704 to softswitch 700 (see steps 7ee, 7ff and 7gg) will not be forwarded to source device 702 as paging is generally a one-way operation.

It can be seen that the prior art system of FIGS. 7A and 7B involves RTP media data passing out of the target network on the customer premises where the source and target devices are located in the form of a data flow or data stream. The prior art system of FIGS. 7A and 7B also involves multiple RTP media streams passing back into the customer premises, one flow for each target device to which media data is to be delivered. Such RTP data flowing in and out of the customer premises can use up valuable bandwidth resources and is therefore undesirable.

Figure 8:
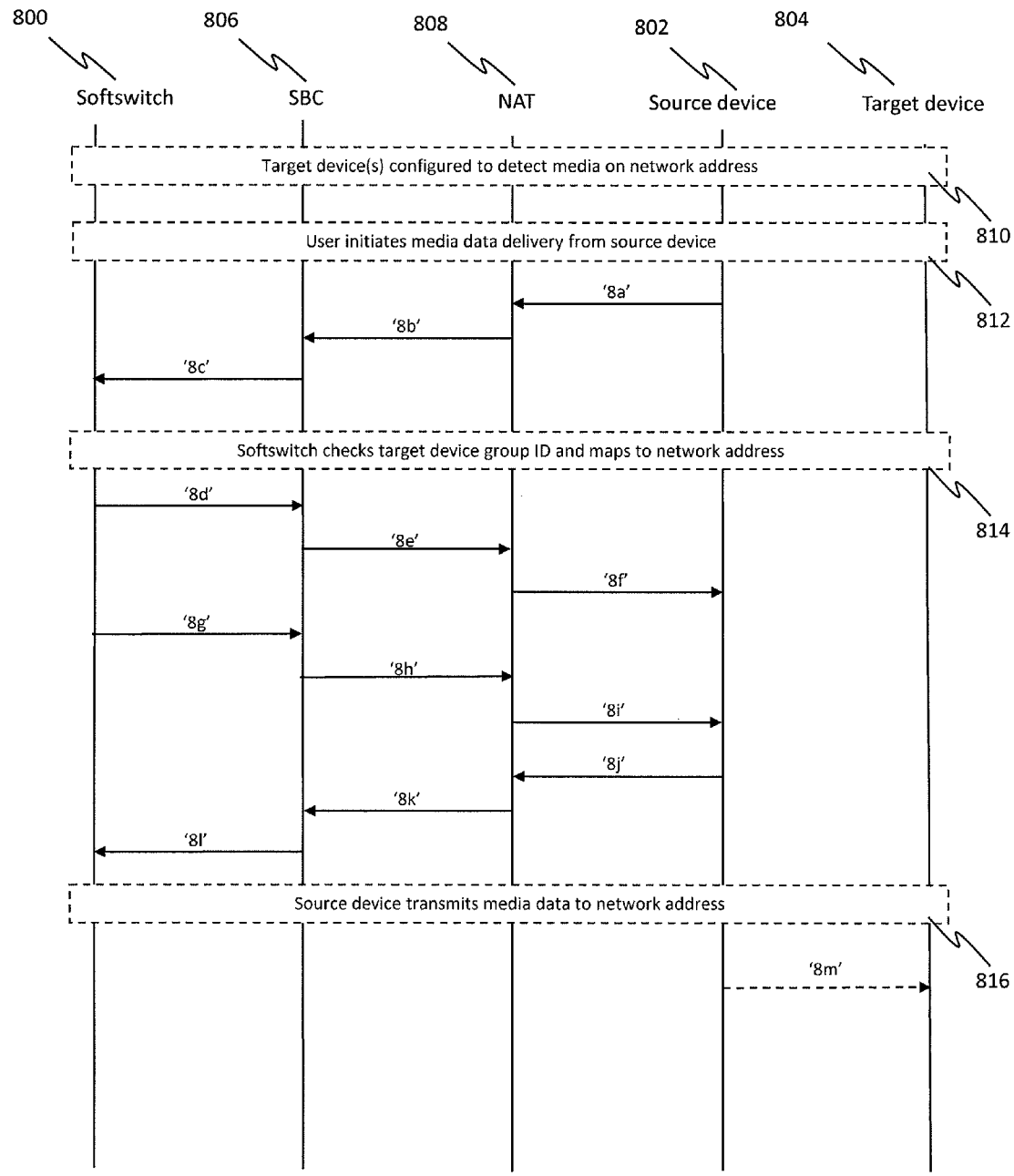
FIG. 8 is a flow diagram showing media data delivery according to an embodiment of the present invention.

FIG. 8 is a flow diagram showing media data delivery according to an embodiment of the present invention. The delivery process may be carried out using the various entities depicted in FIG. 6.

FIG. 8 depicts a Session Initiation Protocol (SIP) environment where a source device 802 with IP address SP1 and a target device 804 with IP address SP2 are located in a target network, for example on a customer premises. Here, media data delivery is transferred using the Real-time Transport Protocol (RTP) and controlled by a softswitch 800 with IP address SW1 which is remote from the target network. Data passes between softswitch 800 and the target network via a session border controller 806 and a NAT router 808.

In step 8/0, target device 804 is configured to detect media data on a network address associated with a group media data delivery mechanism. Such configuration may involve target device 804 registering with a switch (such as switch 512 in FIG. 5) in the target network so that media data transmitted to the switch on a network address associated with the group media data delivery mechanism will be delivered to target device 804.

In step 8/2, a user initiates delivery of media data to target device 804 by making a suitable input on source device 802. The user input triggers transmittal of a media data delivery initiation request in the form of a SIP Invite message, see step 8a, from source device 802 with IP address SP1 to the external IP address SBC01 of SBC 806. The step 8a SIP Invite message contains a target device group indicator, in this case identifying target device 804 (or a group of target devices which target device 804 is part of). The step 8a SIP Invite message also contains Session Description Protocol (SDP) data with IP address SP1.

The step 8a SIP Invite message is received by NAT router 808 which modifies the IP sender address from that of source device 802 before sending on to SBC 806 in a SIP Invite message, see step 8b. This modification of IP sender address involves modifying the sender address from that of source device 802, i.e. SP1, to the external IP address of NAT router 808, i.e. NAT01. No modifications are made to the SDP data.

The step 8b SIP Invite message is received by SBC 806 which modifies the IP sender address, the IP destination address, and also the SDP data contained in the message, before sending on to softswitch 800 in a SIP Invite message, see step 8c. The modification of IP sender address involves modifying the sender address from the external IP address of NAT router 808, i.e. NAT01, to the internal IP address of SBC 806, i.e. SBCSW1. The modification of IP destination address involves modifying the destination address from the external IP address of SBC 806, i.e. SBC01, to the IP address of softswitch 800, i.e. SW1. The SDP data modification involves changing the SDP data to identify the internal IP address of SBC 806, i.e. SBCSW1, rather than the IP address SP1 of source device 802.

In step 8/4, softswitch 800 consults a database (see softswitch 600 and database 610 in FIG. 6) to check that the request to deliver media data to target device 804 is valid by searching the database for a group of target devices corresponding to the target device group indicator contained in the media data delivery initiation request of step 8a. When a corresponding entry in the database is found, softswitch 800 retrieves the network address associated with the group media data delivery mechanism for that group of target devices (in this case, the group of target devices is depicted as a single target device 804 in FIG. 8).

Softswitch 800 then sends a SIP Response 180 Ringing message, see step 8d, addressed to the internal IP address of SBC 806, i.e. SBCSW1. The step 8d SIP Response 180 Ringing message is received by SBC 806 which modifies the IP sender address and the IP destination address, before sending on to NAT router 808 in a SIP Response 180 Ringing message, see step 8e. The modification of IP sender address involves modifying the sender address from the IP address of softswitch 800, i.e. SW1, to the external IP address of SBC 806, i.e. SBC01. The modification of IP destination address involves modifying the destination address from the internal IP address of SBC 806, i.e. SBCSW01, to the external IP address of NAT router 808, i.e. NAT01.

The step 8e SIP 180 Ringing message is received by NAT router 808 which modifies the IP sender address and the IP destination address before sending on to target device 804 in a SIP Response 180 Ringing message, see step 8f The modification of the IP sender address involves modifying the sender address from the external IP address of SBC 806, i.e. SBC01, to the internal IP address of NAT router 808, i.e. NATSP1. The modification of IP destination address involves modifying the destination address from the external IP address of NAT router 808, i.e. NAT01, to the IP address of source device 802, SP1.

Softswitch 800 also sends a media data delivery initiation response in the form of a SIP Response 200 OK message, see step 8g, to the internal IP address of SBC 806, i.e. SBCSW1. The step 8g SIP Response 200 OK message contains data identifying network address M1 in the target network associated with a group media data delivery mechanism, i.e. SDP data with IP address M1 associated with the group media data delivery mechanism, for example a multicast IP address provided and supported by switch 512.

It should be understood that the SBC does not modify the SDP data in this case. This means that the SDP data contained in the step 8g SIP Response 200 OK message is the same as that contained in the step 8h SIP Response 200 OK message, i.e. that SDP media data should be sent to the multicast IP address M1.

This is in contrast to the prior art process of FIGS. 6A and 6B where the SDP data was modified to instruct that RTP media data should be sent to the external IP address of SBC 806, i.e. SBC01. This prior art behaviour is conventional behaviour for an SBC, i.e. it will modify the IP address in SDP data of messages passing through it, replacing SDP data with its own IP address. If such conventional behaviour were to occur, this would result in RTP media data being looped out of the target network and subsequently back in again which is undesirable.

This conventional behaviour is modified according to embodiments of the present invention, so that RTP media data may be kept within a target network rather than passing out of the target network from source device to softswitch and then back again into the target network in multiple RTP media data streams. This is achieved by configuring the SBC to not modify SDP data for certain predefined individual IP addresses, or a certain predefined range of IP addresses, so that SDP data for such predefined IP addresses may pass through the SBC unmodified.

The configuration of the SBC could come in the form of triggering an exception in the SBC when a media data delivery initiation response is received, i.e. when a media data delivery initiation response such as that of step 8g is received, an exception is triggered such that the conventional behaviour of the SBC is over-ridden and the SDP data may be forwarded with a network address unmodified, i.e. M1 associated with the group media data delivery mechanism remains unchanged.

The step 8g SIP Response 200 OK message is received by SBC 806 which modifies the IP sender address and the IP destination address, before sending on to NAT router 808 in a SIP Response 200 OK message, see step 8h. The modification of IP sender address involves modifying the sender address from the IP address of softswitch 800, i.e. SW1, to the external IP address of SBC 806, i.e. SBC01. The modification of IP destination address involves modifying the destination address from the internal IP address of SBC 806, i.e. SBCSW0, to the external IP address of NAT router 808, i.e. NAT01. As described above, no modification of SDP data occurs here.

The step 8h SIP Invite message is received by NAT router 808 which modifies the IP sender address and the IP destination address before sending on to target device 804 in a SIP Response 200 OK message, see step 8i. The modification of the IP sender address involves modifying the sender address from the external IP address of SBC 806, i.e. SBC01, to the internal IP address of NAT router 808, i.e. NATSP1. The modification of IP destination address involves modifying the destination address from the external IP address of NAT router 808, i.e. NAT01, to the IP address of source device 802, SP1.

Source device 802 acknowledges receipt of the step 8i SIP Response 200 OK message by sending a SIP ACK message to, see step 8j, to the external IP address of SBC 806, i.e. SBC01. The step 8j SIP ACK message is received by NAT router 808 which modifies the IP sender address from that of target device 802 before sending on to SBC 806 in a SIP ACK message, see step 8k. This modification of IP sender address involves modifying the sender address from that of source device 804, i.e. SP1, to the external IP address of NAT router 808, i.e. NAT01.

The step 8k SIP ACK message is received by SBC 806 which modifies the IP sender address and the IP destination address before sending on to softswitch 800 in a SIP ACK message, see step 8*l*. The modification of IP sender address involves modifying the sender address from the external IP address of NAT router 808, i.e. NAT01, to the internal IP address of SBC 806, i.e. SBCSW1. The modification of IP destination address involves modifying the destination address from the external IP address of SBC 806, i.e. SBC01, to the IP address of softswitch 800, i.e. SW1.

The above process can be repeated for each additional target device that media data is to be delivered to, where message flows for each additional target device will be clear to one skilled in the art.

Source device 802 is now able to transmit media data to IP address M1 for which target device 804 is configured to receive media from, see step 8/6. Media data, for example RTP data associated with picked-up speech of a user of source device 802, is then delivered from source device 802 having IP address SP1 to target device 804 having IP address SP2 via IP address M1 associated with the group media data delivery mechanism, see step 8*m*. If target device 804 is configured in a media output mode which allows 'auto-play', the RTP media data can be played as audio by target device 804 approximately in real-time as the RTP media is received. Other target devices configured to receive media data from IP address M1 via the group media data delivery mechanism will likewise receive the RTP media data.

It can be seen that the embodiment of the present invention of FIG. 8 does not involve any RTP media data passing out of or back into the customer premises. All RTP media data thus stays within the target network itself, so valuable bandwidth resources into and out of the target premises are advantageously not used up by employing the present invention.

Figure 9A:
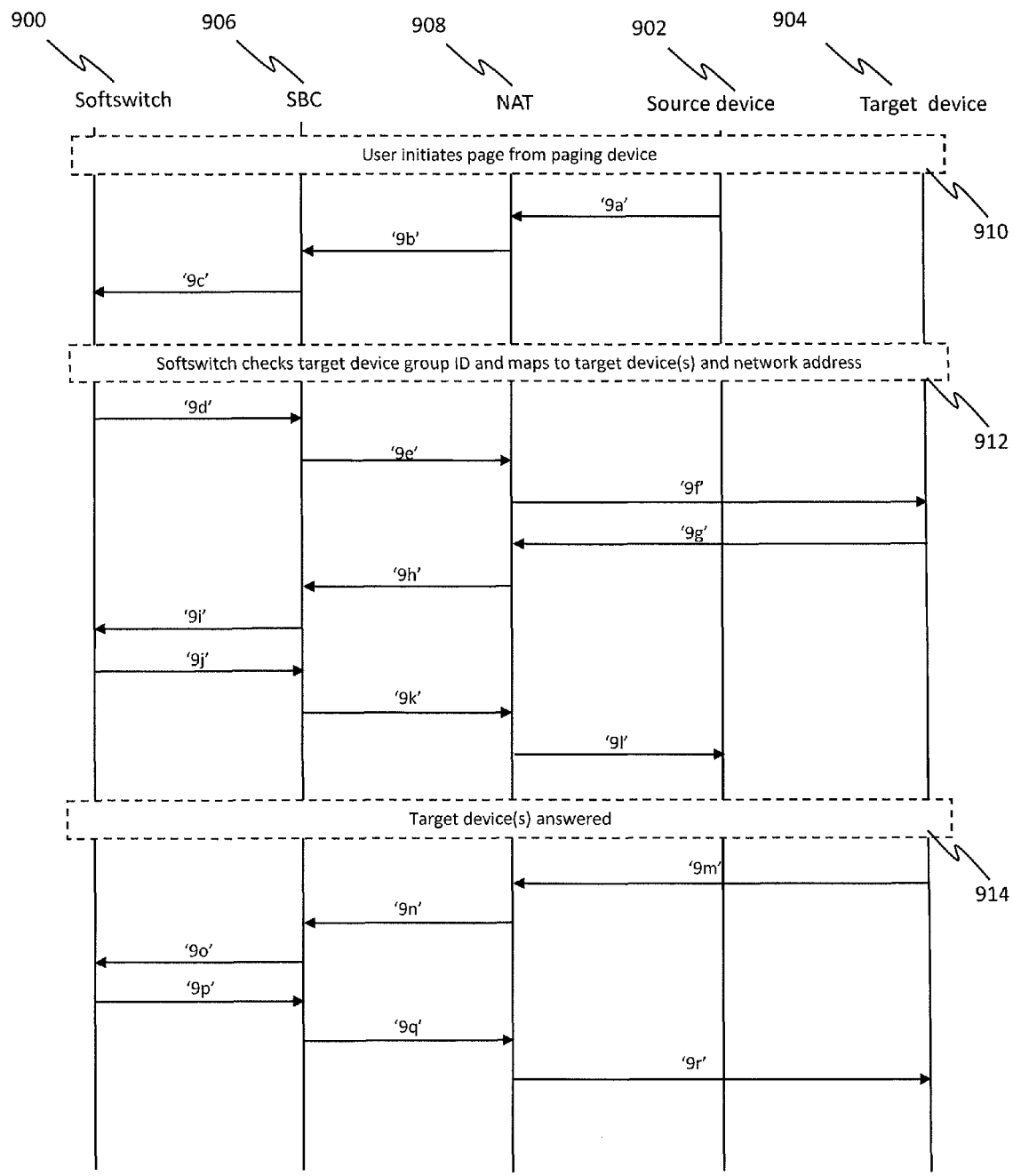
FIGS. 9A and 9B are flow diagrams showing media data delivery according to an embodiment of the present invention.
Figure 9B:
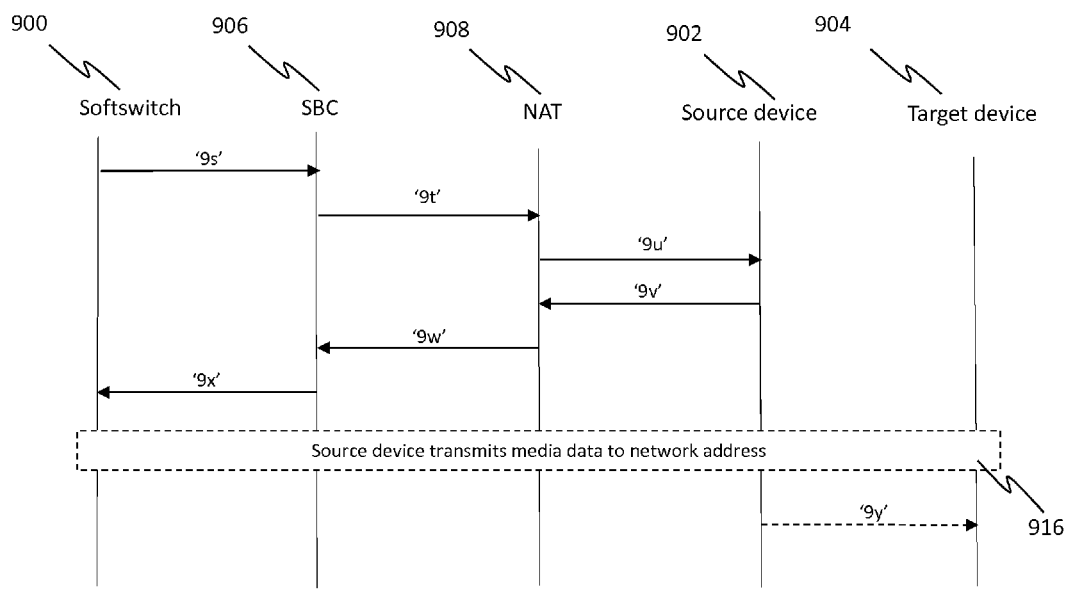

FIGS. 9A and 9B are a flow diagram showing media data delivery according to an embodiment of the present invention. The delivery process may be carried out using the various entities depicted in FIG. 6.

FIGS. 9A and 9B depict a Session Initiation Protocol (SIP) environment where a source device 902 with IP address SP1 and a target device 904 with IP address SP2 are located in a target network, for example on a customer premises. Here, media data delivery is transferred using the Real-time Transport Protocol (RTP) and controlled by a softswitch 900 with IP address SW1 which is remote from the target network. Data passes between softswitch 900 and the target network via a session border controller 906 and a NAT router 908.

In step 9/0, a user initiates delivery of media data to target device 904 by making a suitable input on source device 902. The user input triggers transmittal of a media data delivery initiation request in the form of a SIP Invite message, see step 9*a*, from source device 902 with IP address SP1 to the external IP address SBC01 of SBC 906. The step 9*a* SIP Invite message contains a target device group indicator, in this case identifying target device 904 (or a group of target devices which target device 904 is part of). The step 9*a* SIP Invite message also contains Session Description Protocol (SDP) data with IP address SP1.

The step 9*a* SIP Invite message is received by NAT router 908 which modifies the IP sender address from that of source device 902 before sending on to SBC 906 in a SIP Invite message, see step 9*b*. This modification of IP sender address involves modifying the sender address from that of source device 902, i.e. SP1, to the external IP address of NAT router 908, i.e. NAT01. No modifications are made to the SDP data.

The step 9*b* SIP Invite message is received by SBC 906 which modifies the IP sender address, the IP destination address, and also the SDP data contained in the message, before sending on to softswitch 900 in a SIP Invite message, see step 9*c*. The modification of IP sender address involves modifying the sender address from the external IP address of NAT router 908, i.e. NAT01, to the internal IP address of SBC 906, i.e. SBCSW1. The modification of IP destination address involves modifying the destination address from the external IP address of SBC 906, i.e. SBC01, to the IP address of softswitch 900, i.e. SW1. The SDP data modification involves changing the SDP data to identify the internal IP address of SBC 906, i.e. SBCSW1, rather than the IP address SP1 of source device 902.

In step 9/2, softswitch 900 consults a database (see softswitch 600 and database 610 in FIG. 6) to check that the request to deliver media data to target device 904 is valid by searching the database for a group of target devices corresponding to the target device group indicator contained in the media data delivery initiation request of step 9*a*. When a corresponding entry in the database is found, softswitch 900 retrieves the network address associated with the group media data delivery mechanism for that group of target devices, and IP addresses for the target devices in the group (in this case, the group of target devices is depicted as a single target device 904 in FIG. 9).

Softswitch 900 sends a media data delivery alert message in the form of a SIP Invite message, see step 9*d*, to the internal IP address of SBC 906, i.e. SBCSW1. The step 9*d* media data delivery alert message contains data identifying network address M1 in the target network associated with a group media data delivery mechanism, i.e. SDP data containing IP address M1 associated with the group media data delivery mechanism. M1 may for example be a multicast IP address provided and supported by switch 512, in which case, target device 904 can register with switch 512 in order to have media data transmitted to multicast IP address M1 delivered to it.

The step 9*d* SIP Invite message is received by SBC 906 which modifies the IP sender address and the IP destination address, before sending on to NAT router 908 in a SIP Invite message, see step 9*e*. The modification of IP sender address involves modifying the sender address from the IP address of softswitch 900, i.e. SW1, to the external IP address of SBC 906, i.e. SBC01. The modification of IP destination address involves modifying the destination address from the internal IP address of SBC 906, i.e. SBCSW01, to the external IP address of NAT router 908, i.e. NAT01.

In a similar manner to the FIG. 7 embodiment of the present invention described above, the SBC does not modify the SDP data here. This means that the SDP data contained in the media data delivery alert message, i.e. the step 9*d* SIP Invite message is the same as that contained in the step 9*e* SIP Invite message.

The step 9*e* SIP Invite message is received by NAT router 908 which modifies the IP sender address and the IP destination address before sending on to target device 904 in a SIP Invite message, see step 9*f*. The modification of the IP sender address involves modifying the sender address from the external IP address of SBC 906, i.e. SBC01, to the internal IP address of NAT router 908, i.e. NATSP1. The modification of IP destination address involves modifying the destination address from the external IP address of NAT router 908, i.e. NAT01, to the IP address of target device 904, SP2.

Target device 904 having IP address SP2 then sends a SIP Response 180 Ringing message, see step 9*g*, to the external IP address of SBC 906, i.e. SBC01. The step 9*g* SIP Response 180 Ringing message does not contain any SDP data.

The step 9*g* SIP Response 180 Ringing message is received by NAT router 908 which modifies the IP sender address before sending on to SBC 906 in a SIP Response 180 Ringing message, see step 9*h*. This modification of IP sender address involves modifying the sender address from that of target device 904, i.e. SP2, to the external IP address of NAT router 908, i.e. NAT01.

The step 9h SIP Response 180 Ringing message is received by SBC 906 which modifies the IP sender address and the IP destination address, before sending on to softswitch 900 in a SIP Response 180 Ringing message, see step 9i. The modification of IP sender address involves modifying the sender address from the external IP address of NAT router 908, i.e. NAT01, to the internal IP address of SBC 906, i.e. SBCSW1. The modification of IP destination address involves modifying the destination address from the external IP address of SBC 906, i.e. SBC01, to the IP address of softswitch 900, i.e. SW1.

Softswitch 900 then sends a SIP Response 180 Ringing message, see step 9j, addressed to the internal IP address of SBC 906, i.e. SBCSW1.

The step 9j SIP Response 180 Ringing message is received by SBC 906 which modifies the IP sender address and the IP destination address, before sending on to NAT router 908 in a SIP Response 180 Ringing message, see step 9k. The modification of IP sender address involves modifying the sender address from the IP address of softswitch 900, i.e. SW1, to the external IP address of SBC 906, i.e. SBC01. The modification of IP destination address involves modifying the destination address from the internal IP address of SBC 906, i.e. SBCSW01, to the external IP address of NAT router 908, i.e. NAT01.

The step 9k SIP 180 Ringing message is received by NAT router 908 which modifies the IP sender address and the IP destination address before sending on to target device 904 in a SIP Response 180 Ringing message, see step 9l. The modification of IP sender address involves modifying the sender address from the external IP address of SBC 906, i.e. SBC01, to the internal IP address of NAT router 908, i.e. NATSP1. The modification of IP destination address involves modifying the destination address from the external IP address of NAT router 908, i.e. NAT01, to the IP address of source device 902, SP1.

Target device 904 is answered in step 9l4, the process by which this occurs will be described in more detail below.

Once target device 904 has been answered, target device 904 sends a SIP Response 200 OK message, see step 9m, to the external IP address of SBC 906, i.e. SBC01. The step 9m SIP Response 200 OK message does not contain SDP data as target device 904 is only to receive RTP media data.

The step 9m SIP Response 200 OK message is received by NAT router 908 which modifies the IP sender address from that of target device 902 before sending on to SBC 906 in a SIP Response 200 OK message, see step 9n. This modification of IP sender address involves modifying the sender address from that of target device 904, i.e. SP2, to the external IP address of NAT router 908, i.e. NAT01.

The step 9n SIP Response 200 OK message is received by SBC 906 which modifies the IP sender address, the IP destination address, and also the SDP data contained in the message, before sending on to softswitch 900 in a SIP Response 200 OK, see step 9o. The modification of IP sender address involves modifying the sender address from the external IP address of NAT router 908, i.e. NAT01, to the internal IP address of SBC 906, i.e. SBCSW1. The modification of IP destination address involves modifying the destination address from the external IP address of SBC 906, i.e. SBC01, to the IP address of softswitch 900, i.e. SW1. The SDP data modification involves changing the SDP data to identify the internal IP address of SBC 606, i.e. SBCSW1, rather than the IP address SP2 of source device 904.

Softswitch 900 acknowledges receipt of the step 9o SIP Response 200 OK message by sending a SIP ACK message, see step 9p, addressed to the internal IP address of SBC 906, i.e. SBCSW1. The step 9p SIP ACK message is received by SBC 906 which modifies the IP sender address and the IP destination address before sending on to NAT router 908 in a SIP ACK message, see step 9q. The modification of IP sender address involves modifying the sender address from the IP address of softswitch 900, i.e. SW1, to the external IP address of SBC 906, i.e. SBC01. The modification of IP destination address involves modifying the destination address from the internal IP address of SBC 906, i.e. SBCSW01, to the external IP address of NAT router 908, i.e. NAT01. The step 9q SIP ACK message is received by NAT router 908 which modifies the IP sender address and the IP destination address before sending on to target device 904 in a SIP ACK message, see step 9r. The modification of IP sender address involves modifying the sender address from the external IP address of SBC 906, i.e. SBC01, to the internal IP address of NAT router 908, i.e. NATSP1. The modification of IP destination address involves modifying the destination address from the external IP address of NAT router 908, i.e. NAT01, to the IP address of target device 904, SP2.

Softswitch 900 now sends a media data delivery initiation response in the form of a SIP Response 200 OK message, see step 9s, to the internal IP address of SBC 906, i.e. SBCSW1. The step 9s SIP Response 200 OK message contains data identifying network address M1 in the target network associated with a group media data delivery mechanism, i.e. SDP data with IP address M1 associated with the group media data delivery mechanism instructing that RTP media data should be sent to IP address M1.

The step 9s SIP Response 200 OK message is received by SBC 906 which modifies the IP sender address and the IP destination address, before sending on to NAT router 908 in a SIP Invite message, see step 9t. The modification of IP sender address involves modifying the sender address from the IP address of softswitch 900, i.e. SW1, to the external IP address of SBC 906, i.e. SBC01. The modification of IP destination address involves modifying the destination address from the internal IP address of SBC 906, i.e. SBCSW01, to the external IP address of NAT router 908, i.e. NAT01.

As before with the media data alert message, the SBC does not modify the SDP data here. This means that the SDP data contained in the media data delivery response message, i.e. the step 9s SIP Response 200 OK message is the same as that contained in the step 9t SIP Response 200 OK message.

The step 9t SIP Response 200 OK message is received by NAT router 908 which modifies the IP sender address and the IP destination address before sending on to target device 904 in a SIP Response 200 OK message, see step 9u. The modification of the IP sender address involves modifying the sender address from the external IP address of SBC 906, i.e. SBC01, to the internal IP address of NAT router 908, i.e. NATSP1. The modification of IP destination address involves modifying the destination address from the external IP address of NAT router 908, i.e. NAT01, to the IP address of source device 902, SP1.

Source device 902 acknowledges receipt of the step 9u SIP Response 200 OK message by sending a SIP ACK message to, see step 9v, to the external IP address of SBC 906, i.e. SBC01. The step 9v SIP ACK message is received by NAT router 908 which modifies the IP sender address from that of target device 902 before sending on to SBC 906 in a SIP ACK message, see step 6w. This modification of IP sender address involves modifying the sender address from that of source device 904, i.e. SP1, to the external IP address of NAT router 908, i.e. NAT01.

The step 9w SIP ACK message is received by SBC 906 which modifies the IP sender address and the IP destination address before sending on to softswitch 900 in a SIP ACK message, see step 9x. The modification of IP sender address involves modifying the sender address from the external IP address of NAT router 908, i.e. NAT01, to the internal IP address of SBC 906, i.e. SBCSW1. The modification of IP destination address involves modifying the destination address from the external IP address of SBC 906, i.e. SBC01, to the IP address of softswitch 900, i.e. SW1.

The above process can be repeated for each additional target device that media data is to be delivered to, where message flows for each additional target device will be clear to one skilled in the art.

Source device 902 can now transmit media data to IP address M1, see step 916, for which target device 904 is expecting to receive media from. Media data, for example RTP data associated with picked-up speech of a user of source device 902, is then delivered, see step 9y, from source device 902 having IP address SP1 to target device 904 having IP address SP2 via IP address M1 associated with the group media data delivery mechanism.

If the step 9a SIP Invite message contains a target device group indicator associated with a group of target devices, other target devices in the identified group may similarly receive media data from source device 902 via address M1 and its associated group media data delivery mechanism. Such media data will include multiple RTP media streams, although all such RTP streams will only travel within the target network.

The way in which target device 904 is answered in step 9/4 may be carried out using a number of embodiments of the present invention in a similar manner as described above for FIG. 5. For example the media data delivery alert message of step 9d in FIG. 9A could be used in a similar manner as that described above for FIG. 5 and step 5b.

Further, the media data delivery alert message of step 9d in FIG. 9A may also include a source identifier associated with source device 902. Similarly, it should be noted that in the above embodiments relating to answering of target device 904, the SIP Response 180 Ringing messages of steps 9g and 9j may not be necessary.

It can be seen that the embodiment of the present invention depicted in FIGS. 9a and 9B does not involve any RTP media data passing out of or back into the customer premises. All RTP media data thus stays within the target network itself, so valuable bandwidth resources into and out of the target premises are advantageously not used up by employing the present invention.

Note that in the embodiment of FIG. 8, the SDP data is left unmodified by the SBC only for the media data delivery response message, whereas in the embodiment of FIGS. 9A and 9B, the SDP data is left unmodified by the SBC for both the media data delivery response message and also the media data alert message.

Further embodiments of the present invention relate to a session border controller and methods for processing messages at a session border controller in a telecommunications network. When messages directed to a source device are received at a gateway entity such as a session border controller, the messages may contain data identifying a destination address to which media data is to be delivered by the source device. Standard or conventional behaviour of the session border controller may involve modifying the destination addresses of some of the messages to instead identify a network address of the session border controller and transmitting these messages containing modified destination addresses on towards the source device. However, according to the present invention, the session border can be configured to over-ride this standard or conventional behaviour for some of the messages and transmitting these messages containing unmodified destination addresses on towards the source device.

The destination addresses which are modified for some messages and not modified for other messages may be contained in SDP data. The destination addresses may include an IP address and associated port, both of which may be modified for some messages and not modified for other messages. The IP addresses may be multicast IP address and associated port pairs. The SBC may thus be prevented from placing its own external IP address and port as SDP data for one or messages in a session.

The received messages whose destination addresses are not modified may be messages which contain destination addresses (and ports) within a predetermined range of destination addresses and/or one or more predetermined individual destination addresses. Receipt of messages containing destination addresses within a predetermined range of destination addresses and/or one or more predetermined individual destination addresses at the configured session border controller may trigger exceptions which cause the session border controller to not act in the standard or conventional manner. Such non-conventional behaviour can be employed in embodiments of the present invention described above which concern control of the delivery of media data to a plurality of target devices in a target network, for example in a group paging service as described above.

It should be noted that the Figures, in particular the flow diagrams, depict delivery of media data to a single target device, but it should be understood that there would be multiple target devices which each receive delivery of the media data. Further, it should be noted that SIP Response 100 Trying messages will generally be sent in response to receipt of SIP Request Invite messages, but have been omitted in the Figures throughout the description for the sake of brevity.

The above embodiments are to be understood as illustrative examples of the invention. Further embodiments of the invention are envisaged.

For example, in the embodiments of the present invention described above, the source and target devices are located in the same geographical area, defined by the local area network. However, in other embodiments of the invention, the source and target devices may be located in a plurality of local area networks located remotely to each other, which are preferably connected via a high bandwidth link.

In the above-described embodiments, the local area network is in the form of a wired Ethernet LAN. In other embodiments, the local area network may take other forms, such as a wireless LAN (WLAN).

In alternative embodiments of the present invention, target device group control data which is retrieved from the stored target device group control data and included in a media data delivery initiation response could identify a plurality of network addresses. Upon receipt of the response at a source device, the source device could then deliver media data to a plurality of target devices via each network address. In this embodiment, the source device is capable of delivering media data on multiple data streams, flows or channels.

The above-described embodiments involve transmitting a media data delivery initiation response to a source device, the response comprising retrieved target device group control data which includes at least one network address to which media data is to be transmitted by the source device. Alternatively, the control data may not include the network address(es). It may include only a part of the network address(es), with the remaining part(s) being stored in a location accessible to the source device. Alternatively, the control data may not include any part of the network address(es), but include data, for example a code, which uniquely identifies one or more network addresses stored in a location accessible to the source device. Further alternatively, the control data may identify a network location from which the at least one network address is retrievable by the source device. In any case, the or each network address may be a full or partial address or a code which is to be inserted into an address field.

The above embodiments of the present invention primarily describe the invention in terms of a SIP signalling protocol, but the present invention is equally applicable using other packet-based protocols such as the International Telecommunications Union (ITU) H.323 protocol, the Internet Engineering Task Force (IETF) Media Gateway Control Protocol (MGCP) protocol, and suchlike.

The media data delivery embodiments described above relate to group paging. The present invention may also be applied to other group communications systems including conference calling and group-enabled push to talk (PTT) systems. In conference calling embodiments, more than one member of the group may transmit voice signals simultaneously, and the source devices or the target devices may overlay audio signals from more than one of the group so that more than one participant may be heard in the audio output at the same time. The audio output may be sent out through the telephone handsets of the target devices. Group push to talk is similar to group paging, but a source party is only connected to the target parties while the PTT button is depressed, and any member of the group can respond to all of the group by seizing the session.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling delivery of media data to a plurality of target devices in a target network, the method comprising, in a communications control system:
   storing target device group control data for controlling the transmission of media data to at least a first plurality of target devices in the target network, the target network being connected to the communications control system via an access network, the communications control system being located outside the target network;
   receiving a media data delivery initiation request from a source device located in the target network, the request comprising a target device group indicator;
   retrieving target device group control data, from the stored target device group control data, based on the target device group indicator contained in the media data delivery initiation request; and
   transmitting a media data delivery initiation response to the source device, the response comprising the retrieved target device group control data, the retrieved target device group control data identifying at least one network address in the target network to which media data is to be transmitted by the source device, whereby to deliver media data to the first plurality of target devices,
   wherein the at least one network address comprises an address for which, when media data is transmitted to the at least one network address by the source device, media data is delivered to the first plurality of target devices via the target network and not via the access network.

2. The method of claim 1, further comprising configuring the first plurality of target devices to associate a predetermined media data output mode with media data which is addressed to the at least one network address, when the media data is delivered to the configured target devices.

3. The method of claim 2, wherein the predetermined media data output mode is a group paging output mode.

4. The method of claim 2, further comprising:
   prior to the transmittal of the media data to the at least one network address, delivering a media data delivery alert message to one or more of the first plurality of target devices,
   wherein the configuring of the first plurality of target devices occurs in response to receipt of the media data delivery alert message by the first plurality of target devices.

5. The method of claim 4, wherein the media data delivery alert message comprises a SIP INVITE message containing a SIP Alert-Info header.

6. The method of claim 4, wherein the media data delivery alert message comprises a source device identifier associated with the source device.

7. The method of claim 1, wherein the at least one network address is identified in the media data delivery initiation response using the Session Description Protocol.

8. The method of claim 1, wherein a group media data delivery mechanism is associated with the one network address, the group media data delivery mechanism being capable of delivering media data addressed to the one network address to the first plurality of target devices.

9. The method of claim 8, wherein the group media data delivery mechanism comprises at least one of: a broadcast mechanism, a multicast mechanism, an explicit multi-unicast mechanism, a peer-to-peer mechanism, a protocol for synchronous conferencing (PSYC) mechanism, and an Internet Relay Chat (IRC) mechanism.

10. The method of claim 8, wherein the one network address has an associated plurality of ports at a node in the target network, and wherein the group data delivery mechanism provides delivery of media data via the associated ports.

11. The method of claim 8, further comprising registering one or more of the first plurality of target devices with a node in the target network in association with the one network address, the node being configured to provide the group media data delivery mechanism.

12. The method of claim 11, further comprising registering the one or more of the first plurality of target devices prior to transmittal of the media data delivery initiation request.

13. The method of claim 8, wherein the target network comprises an Ethernet switch, and the method comprises copying the media data to the first plurality of devices from the switch in response to receiving media data addressed to the one network address at the switch.

14. The method of claim 1, wherein the communications control system comprises a gateway interfacing with the access network, the gateway being configured to modify network addresses in responses transmitted to source devices, and wherein when the media data delivery initiation response is transmitted from the communications control system, an exception is triggered in the gateway such that the gateway does not modify the network address identified in the response.

15. The method of claim 1, wherein the stored target device group control data comprises target device group control data for controlling the transmission of media data to a plurality of groups of target devices in the target network, wherein the media data delivery initiation request comprises a target device group indicator associated with a given group of target devices in the plurality of groups, and wherein the retrieved target device group control data is associated with the given group of target devices in the plurality of groups, the retrieved target device group control data being selected from the store on the basis of the target device group indicator comprised in the request.

16. The method of claim 15, wherein the stored target device group data comprises an associated port and network address for each group in the plurality, and wherein the group media data delivery mechanism is capable of delivering media data addressed to the port and network address associated with a given group in the plurality of groups to target devices in the given group.

17. The method of claim 1, wherein the retrieved target device group control data comprised in the response identifies a plurality of network addresses to which media data is to be transmitted by the source device.

18. A method of controlling delivery of media data to a plurality of target devices in a target network the method comprising, in the target network:
transmitting, from a source device located in the target network, a media data delivery initiation request to a communications control system, the request comprising a target device group indicator, the target network being connected to the communications control system via an access network, the communications control system being located outside the target network and comprising a store of target device group control data for controlling the transmission of media data to at least a first plurality of target devices in the target network, the stored target device group control data being retrievable based on target device group control indicators contained in media data delivery initiation requests;
receiving, at the source device, a media data delivery initiation response from the communications control system, the response comprising target device group control data retrieved from the store of target device group control data on the basis of the target device group indicator in the media data delivery initiation request, the retrieved target device group control data identifying at least one network address in the target network; and
transmitting media data from the source device to the at least one network address, whereby media data is delivered to the first plurality of target devices,
wherein the at least one network address comprises an address for which, when media data is transmitted to the at least one network address by the source device, media data is delivered to the first plurality of target devices via the target network and not via the access network.

19. A non-transitory computer-readable medium having computer-executable instructions stored thereon, which, when executed, cause a computing device to perform in a communications control system, a method of controlling delivery of media data to a plurality of target devices in a target network, the method comprising:
storing target device group control data for controlling the transmission of media data to at least a first plurality of target devices in the target network, the target network being connected to the communications control system via an access network, the communications control system being located outside the target network;
receiving a media data delivery initiation request from a source device located in the target network, the request comprising a target device group indicator;
retrieving target device group control data, from the stored target device group control data, based on the target device group indicator contained in the media data delivery initiation request; and
transmitting a media data delivery initiation response to the source device, the response comprising the retrieved target device group control data, the retrieved target device group control data identifying at least one network address in the target network to which media data is to be transmitted by the source device, whereby to deliver media data to the first plurality of target devices,
wherein the at least one network address comprises an address for which, when media data is transmitted to the at least one network address by the source device, media data is delivered to the first plurality of target devices via the target network and not via the access network.

20. A communications control system for controlling delivery of media data to a plurality of target devices in a target network, the system comprising:
a function for storing target device group control data for controlling the transmission of media data to at least a first plurality of target devices in the target network, the target network being connected to the communications control system via an access network, the communications control system being located outside the target network;
a function for transmitting a media data delivery initiation request from a source device located in the target network, the request comprising a target device group indicator;
a function for receiving the media data delivery initiation request at the communications control system;
a function for retrieving target device group control data, from the stored target device group control data, based on the target device group indicator contained in the media data delivery initiation request; and
a function for transmitting a media data delivery initiation response from the communications control system, the response comprising the retrieved target device group control data, the retrieved target device group control data identifying at least one network address in the target network to which media data is to be transmitted by the source device;
a function for receiving the media data delivery initiation response at the source device; and
a function for transmitting media data from the source device to the at least one network address, whereby the media data is delivered to the first plurality of target devices,
wherein the at least one network address comprises an address for which, when media data is transmitted to the at least one network address by the source device, media data is delivered to the first plurality of target devices via the target network and not via the access network.

21. A method for processing messages at a session border controller in a telecommunications network, the method comprising:
at the session border controller, receiving a plurality of media data delivery control messages directed to a media data source device, the messages each identifying a media data delivery destination address to which media data is to be delivered by the media data source device;

at the session border controller, modifying the media data delivery destination address identified in one or more of the plurality of received media data delivery control messages to identify a network address of the session border controller as the media data delivery destination address to which media data is to be delivered by the media data source device;

at the session border controller, transmitting, to the media data source device, the one or more media data delivery control messages with the media data delivery destination address to which media data is to be delivered by the media data source device modified; and at the session border controller, transmitting, to the media data source device one or more other media data delivery control messages of the plurality of received media data delivery control messages with the destination address to which media data is to be delivered by the media data source device unmodified.

22. The method of claim 21, wherein the received media data delivery control messages whose media data delivery destination addresses are not modified are control messages which are received identifying destination addresses to which media data is to be delivered by the media data source device which are within at least one of a predetermined range of destination addresses and one or more predetermined individual destination addresses.

* * * * *